(12) United States Patent
Czinger et al.

(10) Patent No.: US 11,928,966 B2
(45) Date of Patent: Mar. 12, 2024

(54) VIRTUAL RAILROAD

(71) Applicant: DIVERGENT TECHNOLOGIES, INC., Los Angeles, CA (US)

(72) Inventors: Kevin Robert Czinger, Santa Monica, CA (US); John Russell Bucknell, El Segundo, CA (US); Jinbo Chen, Rancho Palos Verdes, CA (US); Gregory S. Weaver, Los Angeles, CA (US)

(73) Assignee: DIVERGENT TECHNOLOGIES, INC., Los Angeles, CA (US)

( * ) Notice: Subject to any disclaimer, the term of this patent is extended or adjusted under 35 U.S.C. 154(b) by 74 days.

(21) Appl. No.: 17/574,513

(22) Filed: Jan. 12, 2022

(65) Prior Publication Data
US 2022/0223048 A1    Jul. 14, 2022

Related U.S. Application Data

(60) Provisional application No. 63/136,966, filed on Jan. 13, 2021.

(51) Int. Cl.
*G08G 1/00* (2006.01)
*B60W 30/12* (2020.01)
(Continued)

(52) U.S. Cl.
CPC .............. *G08G 1/20* (2013.01); *B60W 30/12* (2013.01); *B60W 30/162* (2013.01);
(Continued)

(58) Field of Classification Search
CPC ......... G08G 1/20; G08G 1/167; B60W 30/12; B60W 30/162; B60W 30/165; B60W 2556/65; H04W 4/44; H04L 2012/40273
See application file for complete search history.

(56) References Cited

U.S. PATENT DOCUMENTS

| | | |
|---|---|---|
| 5,203,226 A | 4/1993 | Hongou et al. |
| 5,742,385 A | 4/1998 | Champa |
| (Continued) | | |

FOREIGN PATENT DOCUMENTS

| | | | |
|---|---|---|---|
| BR | 112020025022 A2 * | 3/2021 | ............... B60Q 1/00 |
| WO | 1996036455 A1 | 11/1996 | |
| | (Continued) | | |

OTHER PUBLICATIONS

US 9,202,136 B2, 12/2015, Schmidt et al. (withdrawn)
(Continued)

*Primary Examiner* — Jelani A Smith
*Assistant Examiner* — Nada Mahyoob Alqaderi
(74) *Attorney, Agent, or Firm* — ARENTFOX SCHIFF LLP

(57) ABSTRACT

A virtual railroad of vehicles is disclosed. In one aspect of the disclosure, a system includes one or more passenger vehicles of a peloton, and a first engine vehicle of the peloton. The first engine vehicle communicatively connected to the one or more passenger vehicles, wherein the first engine vehicle comprises: a processor communicatively connected to a memory and is configured to receive status information of the one or more passenger vehicles, determine, based on the received status information, a set of current values for a set of vehicle attributes for each of the one or more passenger vehicles, and adjust, based on the set of current values for the set of vehicle attributes, a position of a corresponding passenger vehicle of the one or more passenger vehicles.

20 Claims, 22 Drawing Sheets

(51) Int. Cl.
*B60W 30/16* (2020.01)
*B60W 30/165* (2020.01)
*G08G 1/16* (2006.01)
*H04L 12/40* (2006.01)
*H04W 4/44* (2018.01)

(52) U.S. Cl.
CPC ........... *B60W 30/165* (2013.01); *G08G 1/167* (2013.01); *H04L 12/40* (2013.01); *H04W 4/44* (2018.02); *B60W 2556/65* (2020.02); *H04L 2012/40273* (2013.01)

(56) References Cited

U.S. PATENT DOCUMENTS

| | | | |
|---|---|---|---|
| 5,990,444 | A | 11/1999 | Costin |
| 6,010,155 | A | 1/2000 | Rinehart |
| 6,096,249 | A | 8/2000 | Yamaguchi |
| 6,140,602 | A | 10/2000 | Costin |
| 6,250,533 | B1 | 6/2001 | Otterbein et al. |
| 6,252,196 | B1 | 6/2001 | Costin et al. |
| 6,318,642 | B1 | 11/2001 | Goenka et al. |
| 6,365,057 | B1 | 4/2002 | Whitehurst et al. |
| 6,391,251 | B1 | 5/2002 | Keicher et al. |
| 6,409,930 | B1 | 6/2002 | Whitehurst et al. |
| 6,468,439 | B1 | 10/2002 | Whitehurst et al. |
| 6,554,345 | B2 | 4/2003 | Jonsson |
| 6,585,151 | B1 | 7/2003 | Ghosh |
| 6,644,721 | B1 | 11/2003 | Miskech et al. |
| 6,811,744 | B2 | 11/2004 | Keicher et al. |
| 6,866,497 | B2 | 3/2005 | Saiki |
| 6,919,035 | B1 | 7/2005 | Clough |
| 6,926,970 | B2 | 8/2005 | James et al. |
| 7,152,292 | B2 | 12/2006 | Hohmann et al. |
| 7,344,186 | B1 | 3/2008 | Hausler et al. |
| 7,500,373 | B2 | 3/2009 | Quell |
| 7,586,062 | B2 | 9/2009 | Heberer |
| 7,637,134 | B2 | 12/2009 | Burzlaff et al. |
| 7,710,347 | B2 | 5/2010 | Gentilman et al. |
| 7,716,802 | B2 | 5/2010 | Stern et al. |
| 7,745,293 | B2 | 6/2010 | Yamazaki et al. |
| 7,766,123 | B2 | 8/2010 | Sakurai et al. |
| 7,852,388 | B2 | 12/2010 | Shimizu et al. |
| 7,908,922 | B2 | 3/2011 | Zarabadi et al. |
| 7,951,324 | B2 | 5/2011 | Naruse et al. |
| 8,094,036 | B2 | 1/2012 | Heberer |
| 8,163,077 | B2 | 4/2012 | Eron et al. |
| 8,286,236 | B2 | 10/2012 | Jung et al. |
| 8,289,352 | B2 | 10/2012 | Vartanian et al. |
| 8,297,096 | B2 | 10/2012 | Mizumura et al. |
| 8,354,170 | B1 | 1/2013 | Henry et al. |
| 8,383,028 | B2 | 2/2013 | Lyons |
| 8,408,036 | B2 | 4/2013 | Reith et al. |
| 8,429,754 | B2 | 4/2013 | Jung et al. |
| 8,437,513 | B1 | 5/2013 | Derakhshani et al. |
| 8,444,903 | B2 | 5/2013 | Lyons et al. |
| 8,452,073 | B2 | 5/2013 | Taminger et al. |
| 8,599,301 | B2 | 12/2013 | Dowski, Jr. et al. |
| 8,606,540 | B2 | 12/2013 | Haisty et al. |
| 8,610,761 | B2 | 12/2013 | Haisty et al. |
| 8,631,996 | B2 | 1/2014 | Quell et al. |
| 8,675,925 | B2 | 3/2014 | Derakhshani et al. |
| 8,678,060 | B2 | 3/2014 | Dietz et al. |
| 8,686,314 | B2 | 4/2014 | Schneegans et al. |
| 8,686,997 | B2 | 4/2014 | Radet et al. |
| 8,694,284 | B2 | 4/2014 | Berard |
| 8,720,876 | B2 | 5/2014 | Reith et al. |
| 8,752,166 | B2 | 6/2014 | Jung et al. |
| 8,755,923 | B2 | 6/2014 | Farahani et al. |
| 8,787,628 | B1 | 7/2014 | Derakhshani et al. |
| 8,818,771 | B2 | 8/2014 | Gielis et al. |
| 8,873,238 | B2 | 10/2014 | Wilkins |
| 8,978,535 | B2 | 3/2015 | Ortiz et al. |
| 9,006,605 | B2 | 4/2015 | Schneegans et al. |
| 9,071,436 | B2 | 6/2015 | Jung et al. |
| 9,101,979 | B2 | 8/2015 | Hofmann et al. |
| 9,104,921 | B2 | 8/2015 | Derakhshani et al. |
| 9,126,365 | B1 | 9/2015 | Mark et al. |
| 9,128,476 | B2 | 9/2015 | Jung et al. |
| 9,138,924 | B2 | 9/2015 | Yen |
| 9,149,988 | B2 | 10/2015 | Mark et al. |
| 9,156,205 | B2 | 10/2015 | Mark et al. |
| 9,186,848 | B2 | 11/2015 | Mark et al. |
| 9,244,986 | B2 | 1/2016 | Karmarkar |
| 9,248,611 | B2 | 2/2016 | Divine et al. |
| 9,254,535 | B2 | 2/2016 | Buller et al. |
| 9,266,566 | B2 | 2/2016 | Kim |
| 9,269,022 | B2 | 2/2016 | Rhoads et al. |
| 9,327,452 | B2 | 5/2016 | Mark et al. |
| 9,329,020 | B1 | 5/2016 | Napoletano |
| 9,332,251 | B2 | 5/2016 | Haisty et al. |
| 9,346,127 | B2 | 5/2016 | Buller et al. |
| 9,389,315 | B2 | 7/2016 | Bruder et al. |
| 9,399,256 | B2 | 7/2016 | Buller et al. |
| 9,403,235 | B2 | 8/2016 | Buller et al. |
| 9,418,193 | B2 | 8/2016 | Dowski, Jr. et al. |
| 9,457,514 | B2 | 10/2016 | Schwärzler |
| 9,469,057 | B2 | 10/2016 | Johnson et al. |
| 9,478,063 | B2 | 10/2016 | Rhoads et al. |
| 9,481,402 | B1 | 11/2016 | Muto et al. |
| 9,486,878 | B2 | 11/2016 | Buller et al. |
| 9,486,960 | B2 | 11/2016 | Paschkewitz et al. |
| 9,502,993 | B2 | 11/2016 | Deng |
| 9,525,262 | B2 | 12/2016 | Stuart et al. |
| 9,533,526 | B1 | 1/2017 | Nevins |
| 9,555,315 | B2 | 1/2017 | Aders |
| 9,555,580 | B1 | 1/2017 | Dykstra et al. |
| 9,557,856 | B2 | 1/2017 | Send et al. |
| 9,566,742 | B2 | 2/2017 | Keating et al. |
| 9,566,758 | B2 | 2/2017 | Cheung et al. |
| 9,573,193 | B2 | 2/2017 | Buller et al. |
| 9,573,225 | B2 | 2/2017 | Buller et al. |
| 9,586,290 | B2 | 3/2017 | Buller et al. |
| 9,595,795 | B2 | 3/2017 | Lane et al. |
| 9,597,843 | B2 | 3/2017 | Stauffer et al. |
| 9,600,929 | B1 | 3/2017 | Young et al. |
| 9,609,755 | B2 | 3/2017 | Coull et al. |
| 9,610,737 | B2 | 4/2017 | Johnson et al. |
| 9,611,667 | B2 | 4/2017 | GangaRao et al. |
| 9,616,623 | B2 | 4/2017 | Johnson et al. |
| 9,626,487 | B2 | 4/2017 | Jung et al. |
| 9,626,489 | B2 | 4/2017 | Nilsson |
| 9,643,361 | B2 | 5/2017 | Liu |
| 9,662,840 | B1 | 5/2017 | Buller et al. |
| 9,665,182 | B2 | 5/2017 | Send et al. |
| 9,672,389 | B1 | 6/2017 | Mosterman et al. |
| 9,672,550 | B2 | 6/2017 | Apsley et al. |
| 9,676,145 | B2 | 6/2017 | Buller et al. |
| 9,684,919 | B2 | 6/2017 | Apsley et al. |
| 9,688,032 | B2 | 6/2017 | Kia et al. |
| 9,690,286 | B2 | 6/2017 | Hovsepian et al. |
| 9,700,966 | B2 | 7/2017 | Kraft et al. |
| 9,703,896 | B2 | 7/2017 | Zhang et al. |
| 9,713,903 | B2 | 7/2017 | Paschkewitz et al. |
| 9,718,302 | B2 | 8/2017 | Young et al. |
| 9,718,434 | B2 | 8/2017 | Hector, Jr. et al. |
| 9,724,877 | B2 | 8/2017 | Flitsch et al. |
| 9,724,881 | B2 | 8/2017 | Johnson et al. |
| 9,725,178 | B2 | 8/2017 | Wang |
| 9,731,730 | B2 | 8/2017 | Stiles |
| 9,731,773 | B2 | 8/2017 | Gami et al. |
| 9,741,954 | B2 | 8/2017 | Bruder et al. |
| 9,747,352 | B2 | 8/2017 | Karmarkar |
| 9,764,415 | B2 | 9/2017 | Seufzer et al. |
| 9,764,520 | B2 | 9/2017 | Johnson et al. |
| 9,765,226 | B2 | 9/2017 | Dain |
| 9,770,760 | B2 | 9/2017 | Liu |
| 9,773,393 | B2 | 9/2017 | Velez |
| 9,776,234 | B2 | 10/2017 | Schaafhausen et al. |
| 9,782,936 | B2 | 10/2017 | Glunz et al. |
| 9,783,324 | B2 | 10/2017 | Embler et al. |
| 9,783,977 | B2 | 10/2017 | Alqasimi et al. |
| 9,789,548 | B2 | 10/2017 | Golshany et al. |
| 9,789,922 | B2 | 10/2017 | Dosenbach et al. |
| 9,796,137 | B2 | 10/2017 | Zhang et al. |

(56) References Cited

U.S. PATENT DOCUMENTS

| | | |
|---|---|---|
| 9,802,108 B2 | 10/2017 | Aders |
| 9,809,977 B2 | 11/2017 | Carney et al. |
| 9,817,922 B2 | 11/2017 | Glunz et al. |
| 9,818,071 B2 | 11/2017 | Jung et al. |
| 9,821,339 B2 | 11/2017 | Paschkewitz et al. |
| 9,821,411 B2 | 11/2017 | Buller et al. |
| 9,823,143 B2 | 11/2017 | Twelves, Jr. et al. |
| 9,829,564 B2 | 11/2017 | Bruder et al. |
| 9,846,933 B2 | 12/2017 | Yuksel |
| 9,854,828 B2 | 1/2018 | Langeland |
| 9,858,604 B2 | 1/2018 | Apsley et al. |
| 9,862,833 B2 | 1/2018 | Hasegawa et al. |
| 9,862,834 B2 | 1/2018 | Hasegawa et al. |
| 9,863,885 B2 | 1/2018 | Zaretski et al. |
| 9,870,629 B2 | 1/2018 | Cardno et al. |
| 9,879,981 B1 | 1/2018 | Dehghan Niri et al. |
| 9,884,663 B2 | 2/2018 | Czinger et al. |
| 9,898,776 B2 | 2/2018 | Apsley et al. |
| 9,914,150 B2 | 3/2018 | Pettersson et al. |
| 9,919,360 B2 | 3/2018 | Buller et al. |
| 9,931,697 B2 | 4/2018 | Levin et al. |
| 9,933,031 B2 | 4/2018 | Bracamonte et al. |
| 9,933,092 B2 | 4/2018 | Sindelar |
| 9,957,031 B2 | 5/2018 | Golshany et al. |
| 9,958,535 B2 | 5/2018 | Send et al. |
| 9,962,767 B2 | 5/2018 | Buller et al. |
| 9,963,978 B2 | 5/2018 | Johnson et al. |
| 9,971,920 B2 | 5/2018 | Derakhshani et al. |
| 9,976,063 B2 | 5/2018 | Childers et al. |
| 9,987,792 B2 | 6/2018 | Flitsch et al. |
| 9,988,136 B2 | 6/2018 | Tiryaki et al. |
| 9,989,623 B2 | 6/2018 | Send et al. |
| 9,990,565 B2 | 6/2018 | Rhoads et al. |
| 9,994,339 B2 | 6/2018 | Colson et al. |
| 9,996,890 B1 | 6/2018 | Cinnamon et al. |
| 9,996,945 B1 | 6/2018 | Holzer et al. |
| 10,002,215 B2 | 6/2018 | Dowski et al. |
| 10,006,156 B2 | 6/2018 | Kirkpatrick |
| 10,011,089 B2 | 7/2018 | Lyons et al. |
| 10,011,685 B2 | 7/2018 | Childers et al. |
| 10,012,532 B2 | 7/2018 | Send et al. |
| 10,013,777 B2 | 7/2018 | Mariampillai et al. |
| 10,015,908 B2 | 7/2018 | Williams et al. |
| 10,016,852 B2 | 7/2018 | Broda |
| 10,016,942 B2 | 7/2018 | Mark et al. |
| 10,017,384 B1 | 7/2018 | Greer et al. |
| 10,018,576 B2 | 7/2018 | Herbsommer et al. |
| 10,022,792 B2 | 7/2018 | Srivas et al. |
| 10,022,912 B2 | 7/2018 | Kia et al. |
| 10,027,376 B2 | 7/2018 | Sankaran et al. |
| 10,029,415 B2 | 7/2018 | Swanson et al. |
| 10,040,239 B2 | 8/2018 | Brown, Jr. |
| 10,046,412 B2 | 8/2018 | Blackmore |
| 10,048,769 B2 | 8/2018 | Selker et al. |
| 10,052,712 B2 | 8/2018 | Blackmore |
| 10,052,820 B2 | 8/2018 | Kemmer et al. |
| 10,055,536 B2 | 8/2018 | Maes et al. |
| 10,058,764 B2 | 8/2018 | Aders |
| 10,058,920 B2 | 8/2018 | Buller et al. |
| 10,061,906 B2 | 8/2018 | Nilsson |
| 10,065,270 B2 | 9/2018 | Buller et al. |
| 10,065,361 B2 | 9/2018 | Susnjara et al. |
| 10,065,367 B2 | 9/2018 | Brown, Jr. |
| 10,068,316 B1 | 9/2018 | Holzer et al. |
| 10,071,422 B2 | 9/2018 | Buller et al. |
| 10,071,525 B2 | 9/2018 | Susnjara et al. |
| 10,072,179 B2 | 9/2018 | Drijfhout |
| 10,074,128 B2 | 9/2018 | Colson et al. |
| 10,076,875 B2 | 9/2018 | Mark et al. |
| 10,076,876 B2 | 9/2018 | Mark et al. |
| 10,081,140 B2 | 9/2018 | Paesano et al. |
| 10,081,431 B2 | 9/2018 | Seack et al. |
| 10,086,568 B2 | 10/2018 | Snyder et al. |
| 10,087,320 B2 | 10/2018 | Simmons et al. |
| 10,087,556 B2 | 10/2018 | Gallucci et al. |
| 10,099,427 B2 | 10/2018 | Mark et al. |
| 10,100,542 B2 | 10/2018 | GangaRao et al. |
| 10,100,890 B2 | 10/2018 | Bracamonte et al. |
| 10,107,344 B2 | 10/2018 | Bracamonte et al. |
| 10,108,766 B2 | 10/2018 | Druckman et al. |
| 10,113,600 B2 | 10/2018 | Bracamonte et al. |
| 10,118,347 B2 | 11/2018 | Stauffer et al. |
| 10,118,579 B2 | 11/2018 | Lakic |
| 10,120,078 B2 | 11/2018 | Bruder et al. |
| 10,124,546 B2 | 11/2018 | Johnson et al. |
| 10,124,570 B2 | 11/2018 | Evans et al. |
| 10,137,500 B2 | 11/2018 | Blackmore |
| 10,138,354 B2 | 11/2018 | Groos et al. |
| 10,144,126 B2 | 12/2018 | Krohne et al. |
| 10,145,110 B2 | 12/2018 | Carney et al. |
| 10,151,363 B2 | 12/2018 | Bracamonte et al. |
| 10,152,661 B2 | 12/2018 | Kieser |
| 10,160,278 B2 | 12/2018 | Coombs et al. |
| 10,161,021 B2 | 12/2018 | Lin et al. |
| 10,166,752 B2 | 1/2019 | Evans et al. |
| 10,166,753 B2 | 1/2019 | Evans et al. |
| 10,171,578 B1 | 1/2019 | Cook et al. |
| 10,173,255 B2 | 1/2019 | TenHouten et al. |
| 10,173,327 B2 | 1/2019 | Kraft et al. |
| 10,178,800 B2 | 1/2019 | Mahalingam et al. |
| 10,179,640 B2 | 1/2019 | Wilkerson |
| 10,183,330 B2 | 1/2019 | Buller et al. |
| 10,183,478 B2 | 1/2019 | Evans et al. |
| 10,189,187 B2 | 1/2019 | Keating et al. |
| 10,189,240 B2 | 1/2019 | Evans et al. |
| 10,189,241 B2 | 1/2019 | Evans et al. |
| 10,189,242 B2 | 1/2019 | Evans et al. |
| 10,190,424 B2 | 1/2019 | Johnson et al. |
| 10,195,693 B2 | 2/2019 | Buller et al. |
| 10,196,539 B2 | 2/2019 | Boonen et al. |
| 10,197,338 B2 | 2/2019 | Melsheimer |
| 10,200,677 B2 | 2/2019 | Trevor et al. |
| 10,201,932 B2 | 2/2019 | Flitsch et al. |
| 10,201,941 B2 | 2/2019 | Evans et al. |
| 10,202,673 B2 | 2/2019 | Lin et al. |
| 10,204,216 B2 | 2/2019 | Nejati et al. |
| 10,207,454 B2 | 2/2019 | Buller et al. |
| 10,209,065 B2 | 2/2019 | Estevo, Jr. et al. |
| 10,210,662 B2 | 2/2019 | Holzer et al. |
| 10,213,837 B2 | 2/2019 | Kondoh |
| 10,214,248 B2 | 2/2019 | Hall et al. |
| 10,214,252 B2 | 2/2019 | Schellekens et al. |
| 10,214,275 B2 | 2/2019 | Goehlich |
| 10,220,575 B2 | 3/2019 | Reznar |
| 10,220,881 B2 | 3/2019 | Tyan et al. |
| 10,221,530 B2 | 3/2019 | Driskell et al. |
| 10,226,900 B1 | 3/2019 | Nevins |
| 10,232,550 B2 | 3/2019 | Evans et al. |
| 10,234,342 B2 | 3/2019 | Moorlag et al. |
| 10,237,477 B2 | 3/2019 | Trevor et al. |
| 10,252,335 B2 | 4/2019 | Buller et al. |
| 10,252,336 B2 | 4/2019 | Buller et al. |
| 10,254,499 B1 | 4/2019 | Cohen et al. |
| 10,257,499 B2 | 4/2019 | Hintz et al. |
| 10,259,044 B2 | 4/2019 | Buller et al. |
| 10,268,181 B1 | 4/2019 | Nevins |
| 10,269,225 B2 | 4/2019 | Velez |
| 10,272,860 B2 | 4/2019 | Mohapatra et al. |
| 10,272,862 B2 | 4/2019 | Whitehead |
| 10,275,564 B2 | 4/2019 | Ridgeway et al. |
| 10,279,580 B2 | 5/2019 | Evans et al. |
| 10,285,219 B2 | 5/2019 | Fetfatsidis et al. |
| 10,286,452 B2 | 5/2019 | Buller et al. |
| 10,286,603 B2 | 5/2019 | Buller et al. |
| 10,286,961 B2 | 5/2019 | Hillebrecht et al. |
| 10,289,263 B2 | 5/2019 | Troy et al. |
| 10,289,875 B2 | 5/2019 | Singh et al. |
| 10,291,193 B2 | 5/2019 | Dandu et al. |
| 10,294,552 B2 | 5/2019 | Liu et al. |
| 10,294,982 B2 | 5/2019 | Gabrys et al. |
| 10,295,989 B1 | 5/2019 | Nevins |
| 10,303,159 B2 | 5/2019 | Czinger et al. |
| 10,307,824 B2 | 6/2019 | Kondoh |
| 10,310,197 B1 | 6/2019 | Droz et al. |

(56) References Cited

U.S. PATENT DOCUMENTS

| | | | |
|---|---|---|---|
| 10,313,651 B2 | 6/2019 | Trevor et al. | |
| 10,315,252 B2 | 6/2019 | Mendelsberg et al. | |
| 10,336,050 B2 | 7/2019 | Susnjara | |
| 10,337,542 B2 | 7/2019 | Hesslewood et al. | |
| 10,337,952 B2 | 7/2019 | Bosetti et al. | |
| 10,339,266 B2 | 7/2019 | Urick et al. | |
| 10,343,330 B2 | 7/2019 | Evans et al. | |
| 10,343,331 B2 | 7/2019 | McCall et al. | |
| 10,343,355 B2 | 7/2019 | Evans et al. | |
| 10,343,724 B2 | 7/2019 | Polewarczyk et al. | |
| 10,343,725 B2 | 7/2019 | Martin et al. | |
| 10,350,823 B2 | 7/2019 | Rolland et al. | |
| 10,356,341 B2 | 7/2019 | Holzer et al. | |
| 10,356,395 B2 | 7/2019 | Holzer et al. | |
| 10,357,829 B2 | 7/2019 | Spink et al. | |
| 10,357,957 B2 | 7/2019 | Buller et al. | |
| 10,359,756 B2 | 7/2019 | Newell et al. | |
| 10,369,629 B2 | 8/2019 | Mendelsberg et al. | |
| 10,382,739 B1 | 8/2019 | Rusu et al. | |
| 10,384,393 B2 | 8/2019 | Xu et al. | |
| 10,384,416 B2 | 8/2019 | Cheung et al. | |
| 10,389,410 B2 | 8/2019 | Brooks et al. | |
| 10,391,710 B2 | 8/2019 | Mondesir | |
| 10,392,097 B2 | 8/2019 | Pham et al. | |
| 10,392,131 B2 | 8/2019 | Deck et al. | |
| 10,393,315 B2 | 8/2019 | Tyan | |
| 10,400,080 B2 | 9/2019 | Ramakrishnan et al. | |
| 10,401,832 B2 | 9/2019 | Snyder et al. | |
| 10,403,009 B2 | 9/2019 | Mariampillai et al. | |
| 10,406,750 B2 | 9/2019 | Barton et al. | |
| 10,412,283 B2 | 9/2019 | Send et al. | |
| 10,416,095 B2 | 9/2019 | Herbsommer et al. | |
| 10,421,496 B2 | 9/2019 | Swayne et al. | |
| 10,421,863 B2 | 9/2019 | Hasegawa et al. | |
| 10,422,478 B2 | 9/2019 | Leachman et al. | |
| 10,425,793 B2 | 9/2019 | Sankaran et al. | |
| 10,427,364 B2 | 10/2019 | Alves | |
| 10,429,006 B2 | 10/2019 | Tyan et al. | |
| 10,434,573 B2 | 10/2019 | Buller et al. | |
| 10,435,185 B2 | 10/2019 | Divine et al. | |
| 10,435,773 B2 | 10/2019 | Liu et al. | |
| 10,436,038 B2 | 10/2019 | Buhler et al. | |
| 10,438,407 B2 | 10/2019 | Pavanaskar et al. | |
| 10,440,351 B2 | 10/2019 | Holzer et al. | |
| 10,442,002 B2 | 10/2019 | Benthien et al. | |
| 10,442,003 B2 | 10/2019 | Symeonidis et al. | |
| 10,449,696 B2 | 10/2019 | Elgar et al. | |
| 10,449,737 B2 | 10/2019 | Johnson et al. | |
| 10,461,810 B2 | 10/2019 | Cook et al. | |
| 11,614,752 B2* | 3/2023 | Switkes | G05D 1/0295 701/23 |
| 2003/0173173 A1* | 9/2003 | Stephan | B60L 15/005 191/10 |
| 2003/0173174 A1* | 9/2003 | Stephan | B60L 15/005 191/10 |
| 2006/0108783 A1 | 5/2006 | Ni et al. | |
| 2010/0256852 A1* | 10/2010 | Mudalige | G08G 1/164 701/24 |
| 2012/0193153 A1 | 8/2012 | Wellborn et al. | |
| 2014/0277669 A1 | 9/2014 | Nardi et al. | |
| 2017/0113344 A1 | 4/2017 | Schönberg | |
| 2017/0341309 A1 | 11/2017 | Piepenbrock et al. | |
| 2019/0016583 A1 | 1/2019 | Dudar et al. | |
| 2019/0249551 A1 | 8/2019 | Tessien | |
| 2020/0388164 A1 | 12/2020 | Domprobst et al. | |
| 2022/0097698 A1* | 3/2022 | Wang | G08G 1/22 |
| 2022/0299336 A1* | 9/2022 | Oswald | G01C 21/3658 |

FOREIGN PATENT DOCUMENTS

| | | |
|---|---|---|
| WO | 1996036525 A1 | 11/1996 |
| WO | 1996038260 A1 | 12/1996 |
| WO | 2003024641 A1 | 3/2003 |
| WO | 2004108343 A1 | 12/2004 |
| WO | 2005093773 A1 | 10/2005 |
| WO | 2007003375 A1 | 1/2007 |
| WO | 2007110235 A1 | 10/2007 |
| WO | 2007110236 A1 | 10/2007 |
| WO | 2008019847 A1 | 2/2008 |
| WO | 2007128586 A3 | 6/2008 |
| WO | 2008068314 A2 | 6/2008 |
| WO | 2008086994 A1 | 7/2008 |
| WO | 2008087024 A1 | 7/2008 |
| WO | 2008107130 A1 | 9/2008 |
| WO | 2008138503 A1 | 11/2008 |
| WO | 2008145396 A1 | 12/2008 |
| WO | 2009083609 A2 | 7/2009 |
| WO | 2009098285 A1 | 8/2009 |
| WO | 2009112520 A1 | 9/2009 |
| WO | 2009135938 A1 | 11/2009 |
| WO | 2009140977 A1 | 11/2009 |
| WO | 2010125057 A2 | 11/2010 |
| WO | 2010125058 A1 | 11/2010 |
| WO | 2010142703 A2 | 12/2010 |
| WO | 2011032533 A1 | 3/2011 |
| WO | 2014016437 A1 | 1/2014 |
| WO | 2014187720 A1 | 11/2014 |
| WO | 2014195340 A1 | 12/2014 |
| WO | 2015193331 A1 | 12/2015 |
| WO | 2016116414 A1 | 7/2016 |
| WO | 2017036461 A1 | 3/2017 |
| WO | 2019030248 A1 | 2/2019 |
| WO | 2019042504 A1 | 3/2019 |
| WO | 2019048010 A1 | 3/2019 |
| WO | 2019048498 A1 | 3/2019 |
| WO | 2019048680 A1 | 3/2019 |
| WO | 2019048682 A1 | 3/2019 |
| WO | 2020164129 A1 | 8/2020 |

OTHER PUBLICATIONS

US 9,809,265 B2, 11/2017, Kinjo (withdrawn)
US 10,449,880 B2, 10/2019, Mizobata et al. (withdrawn)
International Search Report and the Written Opinion issued for corresponding International Application No. PCT/US22/12324, dated Apr. 6, 2022.

* cited by examiner

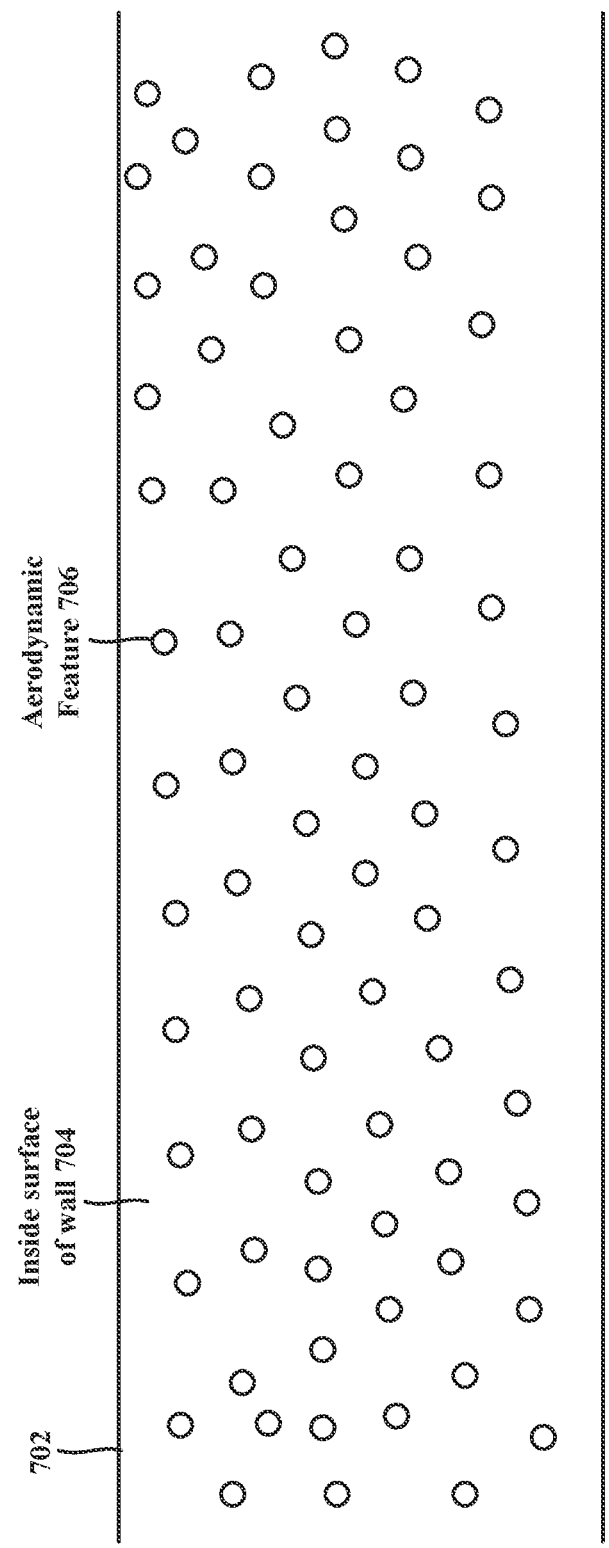

VIRTUAL RAILROAD

CROSS REFERENCE TO RELATED APPLICATION(S)

This application claims the benefit of U.S. Provisional Application Ser. No. 63/136,966, entitled "VIRTUAL RAILROAD" and filed on Jan. 13, 2021, the disclosure of which is expressly incorporated by reference herein in its entirety.

BACKGROUND

Field

The present disclosure relates generally to vehicles and other transport structures, and more particularly, to virtual railroad and a peloton of vehicles.

Background

Current highways are inefficient in preventing traffic congestions, which causes the vehicles travelling on these highways to waste large amounts of energy. Conventionally, to alleviate the stresses on highways is by introducing public railways between nearby cities to encourage citizens to travel using the public railways instead of road vehicles.

However, such public railways are substantially expensive and require significant time to complete them. Various cities and towns may not have the financial resources to build such public railways. Accordingly, such disadvantages have prevented more widespread implementation of public railways and have exacerbated the inefficiencies of the current highways.

SUMMARY

The following presents a simplified summary of one or more aspects of the disclosure in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In various aspects, a system is disclosed. The system may include one or more passenger vehicles of a peloton, and a first engine vehicle of the peloton. The first engine vehicle of the peloton may be communicatively connected to the one or more passenger vehicles. The first engine vehicle comprises a processor communicatively connected to a memory and configured to: receive status information of the one or more passenger vehicles, determine, based on the received status information, a set of current values for a set of vehicle attributes for each of the one or more passenger vehicles, and adjust, based on the set of current values for the set of vehicle attributes, a position of a corresponding passenger vehicle of the one or more passenger vehicles.

Other aspects will become readily apparent to those skilled in the art from the following detailed description, wherein is shown and described only several embodiments by way of illustration. As will be realized by those skilled in the art, concepts herein are capable of other and different embodiments, and several details are capable of modification in various other respects, all without departing from the present disclosure. Accordingly, the drawings and detailed description are to be regarded as illustrative in nature and not as restrictive.

BRIEF DESCRIPTION OF THE DRAWINGS

Various aspects of will now be presented in the detailed description by way of example, and not by way of limitation, in the accompanying drawings, wherein:

FIG. 7 illustrates an example configuration of a wall of virtual railroad lane, in accordance with various aspects of the present disclosure.

DETAILED DESCRIPTION

The detailed description set forth below in connection with the appended drawings is intended to provide a description of various exemplary embodiments of the concepts disclosed herein and is not intended to represent the only embodiments in which the disclosure may be practiced. The term "exemplary" used in this disclosure means "serving as an example, instance, or illustration," and should not necessarily be construed as preferred or advantageous over other embodiments presented in this disclosure. The detailed description includes specific details for the purpose of providing a thorough and complete disclosure that fully conveys the scope of the concepts to those skilled in the art. However, the disclosure may be practiced without these specific details. In some instances, well-known structures and components may be shown in block diagram form, or omitted entirely, in order to avoid obscuring the various concepts presented throughout this disclosure.

As described above, existing highways are inefficient in preventing traffic congestions, which causes the vehicles travelling on these highways to waste large amounts of energy, and public railways are too expensive and time consuming to be implemented in an efficient manner to successfully improve the efficiency of existing highways.

Accordingly, the present disclosure is generally directed to systems and techniques for using one or more lanes of a highway, roadway, etc., for a virtual railroad (VRR). In various embodiments, existing lanes of a highway may be repurposed for the VRR, thereby saving the cost of constructing VRR lanes. The VRR described herein includes one or more passenger vehicles that are communicatively coupled with an engine vehicle to form a peloton of vehicles. The peloton may be led by the engine vehicle, and the engine vehicle may control the movement of the passenger vehicles communicatively coupled to the engine vehicle. Furthermore, the present disclosure provides a VRR system that includes a dedicated VRR lane for the VRR peloton to travel. In some implementations, the VRR lane may be a dedicated lane adjacent to regular traffic lanes. In some implementations, the VRR lane may include one or more aerodynamic features, which allow for the vehicles of the VRR peloton to travel faster while expending less energy.

Additional details of the VRR system are described herein with respect to FIGS. 1-10F.

Figure 1:
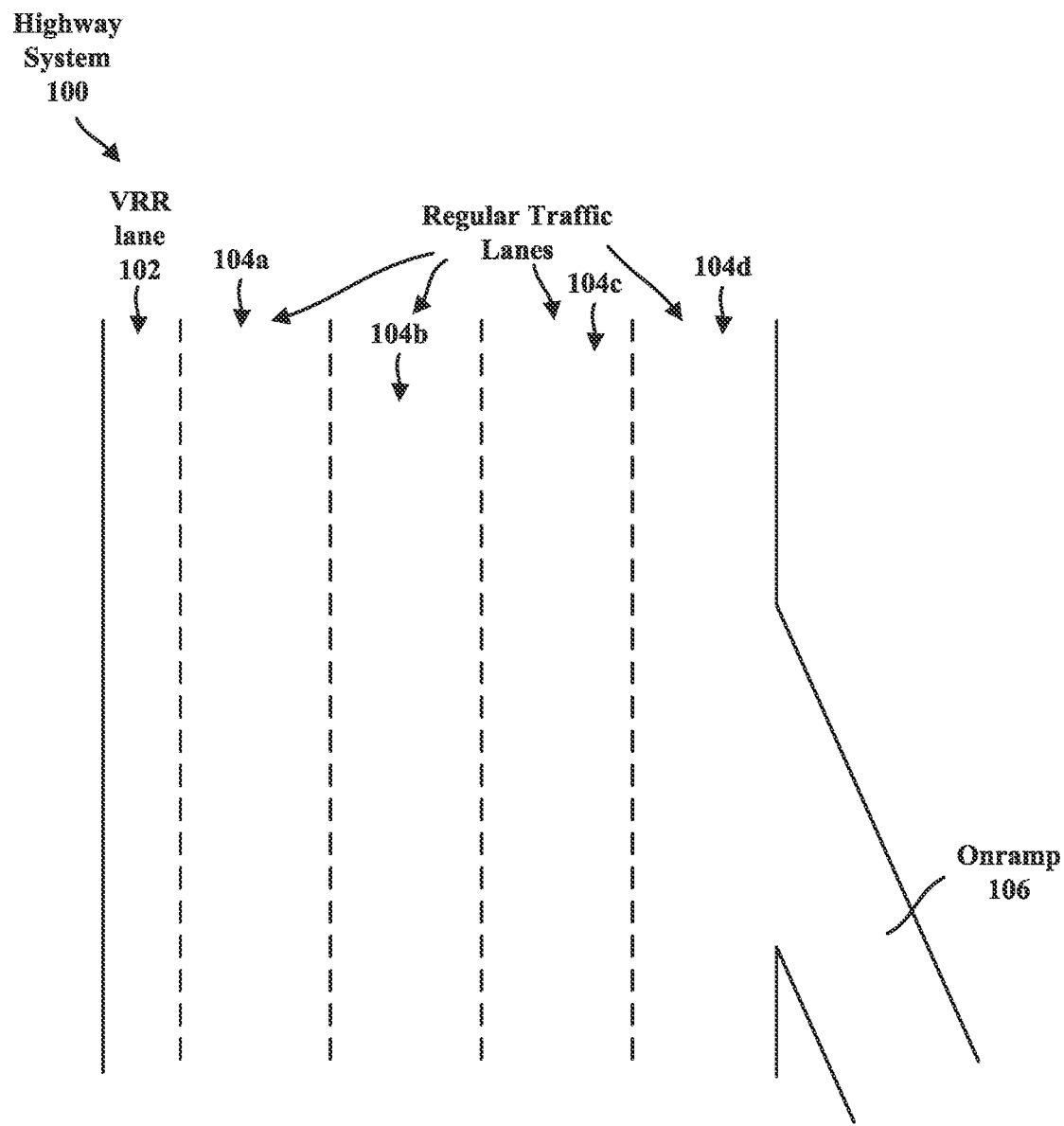
FIG. 1 illustrates an example of a virtual railroad lane, in accordance with various aspects of the present disclosure.

Turning now to FIG. 1, there is shown an example VRR lane in a highway system 100. As shown in FIG. 1, the highway system 100 may include the VRR lane 102 and one or more regular traffic lanes 104a, 104b, 104c, 104d, collectively referred to herein as regular traffic lanes 104. In some implementations, as shown in FIG. 1, the highway system 100 may include an onramp lane 106. The onramp lane 106 may configured to allow for one or more vehicles to enter the highway system 100. The one or more vehicles may merge with a peloton travelling on the VRR lane 102 after the one or more vehicles enter the highway system 100.

In some implementations, the VRR lane 102 may be added as an outer most lane of a highway system. For example, as shown in FIG. 1, the left most lane of the highway system 100 may be configured to be a VRR lane (e.g., VRR lane 102). Similarly, in some implementations, the VRR lane 102 may be the right most lane of a highway system lanes.

The dedicated VRR lane 102 may be configured to be narrower than one or more regular and/or standard traffic lanes 104. For example, the width of the VRR lane 102 may be eight feet or close to eight feet. The narrower width of the VRR lane 102 may allow for a VRR lane to be more easily added into existing highway systems. The narrower width of the VRR lane 102 may allow for the VRR lane 102 to fit more easily within existing space limitations of a highway system. For example, a VRR lane 102 may be created from a portion of the space occupied by an existing regular traffic lane. In some implementations, the efficiency of a peloton or the VRR system described herein may be improved by selecting a road surface material of the VRR lane 102 that reduces rolling resistance of the engine and/or the passenger vehicles of the peloton.

Figure 2:
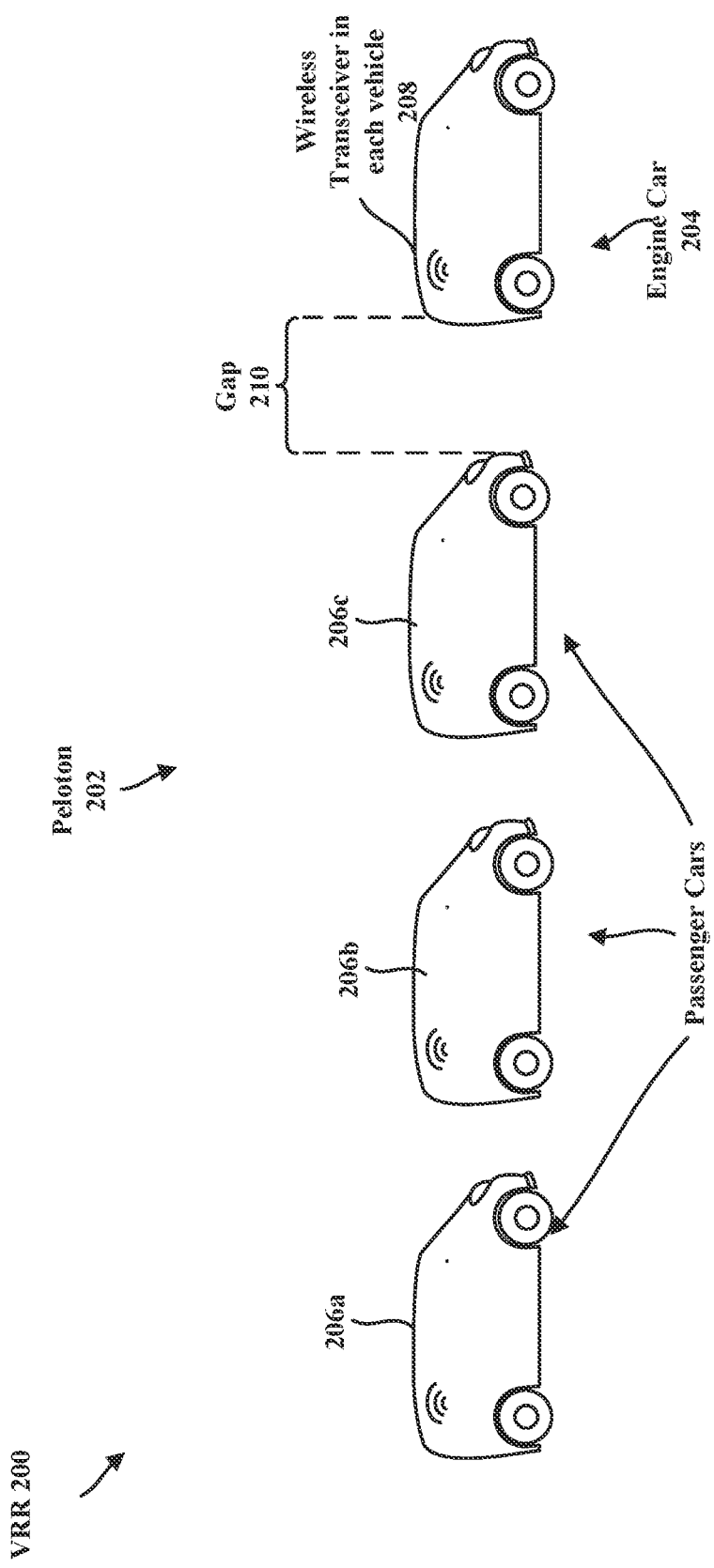
FIG. 2 illustrates an example of a peloton of vehicles, in accordance with various aspects of the present disclosure.

Turning now to FIG. 2, there is shown an example VRR 200. The VRR 200 may include a peloton 202. The peloton 202 may include an engine vehicle 204 and one or more passenger vehicles 206a, 206b, 206c, 206d, collectively referred to herein as passenger vehicles 206. In some implementations, the passenger vehicles 206 may be an any type of a vehicle. In some implementations, a passenger vehicle 206 may be an internal combustion engine (ICE) vehicle, an electric vehicle, a hybrid vehicle, and the like. In some implementations, the peloton 202 may include different types of passenger vehicles. For example, the peloton 202 may include a combination of ICE, electric, and/or hybrid passenger vehicles 206. In some implementations, the passenger vehicles 206 may be configured to have the lowest aerodynamic drag.

The engine vehicle 204 of the peloton 202 may be an ICE vehicle, an electric vehicle, a hybrid vehicle, and the like. In some implementations, the vehicle 204 may have 400 horsepower (hp) and use net zero carbon fuel. In some implementations, the engine vehicle 204 may have specialized aerodynamic features to increase the overall energy efficiency of the peloton 202. For example, the engine vehicle 204 may be configured to have the lowest aerodynamic drag. In some implementations, the engine vehicle 204 may have a long slender body. In some implementations, the total aerodynamic efficiency of the passenger vehicles 206 and the engine vehicle 204 may be compounded as a result of the engine vehicle 204 and the passenger vehicles 206 forming the peloton 202. The aerodynamic efficiency of the peloton 202 may also reduce the energy consumption of the passenger vehicles 206 while they are travelling in the peloton 202.

The peloton 202, as shown in FIG. 2, may be formed with a threshold gap or distance 210 between the engine vehicle 204 and the passenger vehicles 206 of the peloton 202. In some implementations, the threshold gap 210 may be predetermined. Each vehicle of the peloton 202 may include a wireless transceiver 208. The engine vehicle 204 and one or more passenger vehicles 206 of the peloton 202 may be communicatively coupled with each or other via the wireless transceivers 208. In some implementations, the tires of the engine vehicles 204 and/or passenger vehicles 206 may be selected such that the rolling resistance of the peloton 202 may be reduced and/or optimized.

By forming the peloton 202, the passenger vehicles 206 can draft behind the engine vehicle 204 to travel at high speeds (e.g., between 100-120 miles per hour (mph)). Additionally, due to the aerodynamic features of the engine vehicle 204 and the passenger vehicles 206, the engine vehicle 204 and the passenger vehicles 206 may travel at high speeds while saving significant amounts of energy while travelling.

The engine vehicle 204 may be configured to control the passenger vehicles 206 that are part of the peloton 202. For example, the engine vehicle 204 may be configured to control one or more operational aspects of one or more of the passenger vehicles, such as, the powertrain, braking, speed, and the like of the passenger vehicles 206. In some implementations, each vehicle of the peloton 202 may be physically connected to at least one other vehicle of the peloton 202. In some implementations, the engine vehicle 204 may configured to pull the passenger vehicles 206 when each of the engine vehicle 204 or the passenger vehicles 206 are connected to at least another vehicle of the peloton 202.

In some implementations, the engine vehicle 204 may be an autonomous vehicle. An autonomous vehicle that does not need to have a human driver riding along may offer advantages. For example, the engine vehicle 204 may be constructed from lightweight materials because it need not include one of more safety structures, such as crash rails, and the like. In some implementations, tires of an autonomous engine vehicle 204 may be formed from highly-efficient hard rubber because comfort is not a factor without a human occupant.

In some implementations, one or more passenger vehicles 206 may be configured to use their own power to travel in the peloton 202. For example, instead of the engine vehicle 204 pulling the passenger vehicles 206, the engine vehicle 204 may be configured to transmit an instruction and/or a message to the passenger vehicles 206 to cause them to travel at a desired speed. In some implementations, the desired speed may be a predetermined speed. In some implementations, the engine vehicle 204 may be configured to determine the desired speed based on environmental factors (e.g., weather, road conditions, and the like), operational factors of the vehicles of the peloton 202 (e.g., maximum speed of the passenger vehicles, maximum speed of the engine vehicle, and the like). In some implementations, the engine vehicle 204 may be operated by entity, such as an government entity, a transit authority, and the like. The engine vehicle 204 may be operated on a predetermined schedule throughout the day.

The passenger vehicles 206 may be autonomous vehicles. The passenger vehicles 206 may be configured to autonomously couple with a peloton of vehicles (e.g., peloton 202). In some implementations, the passenger vehicles 206 may be configured to autonomously couple with the peloton 202 once the passenger vehicle 206 is at a coupling location (e.g., a virtual station), and other operating conditions are satisfied.

In some implementations, each engine vehicle 204 and each passenger vehicle 206 may include one or more processors and memory to store instructions executable by the one or more processors. The engine vehicle 204 and the passenger vehicles 206 may be configured with a software application, which may be configured to schedule trips using the VRR peloton. The software application may allow the user to coordinate the trips such that the user's passenger vehicle 206 can couple with a regularly-scheduled engine vehicle at an appropriate location and time and decouple at the appropriate location.

In some implementations, the engine vehicle 204 may be configured to monitor operational status attributes and/or parameters (e.g., battery status, energy storage status, fuel level, operational range, travel range, tire health, wheel health, operational health, size of gap or distance between vehicles of the peloton, temperature of one or more components, and the like), emergency status attributes and/or parameters (e.g., any vehicle component failure, battery failure, brake failure, component temperatures exceeding predetermined temperature thresholds, and the like) and the like of itself and the passenger vehicles. In some implementations, passenger vehicle 206 may monitor its own operational status, including the size of gap or distance between itself and at least one other vehicle in the peloton (e.g., the vehicle ahead of it in the peloton) and communicate the operational status with the engine vehicle 204. The engine vehicle 204 and the passenger vehicles 206 may be include one or more sensors configured to monitor and record data related to the operational and/or emergency status attributes and/or parameters. In some implementations, the one or more sensors may be communicatively coupled with the one or more processors and/or memory of the vehicles (e.g., engine vehicle 204 and passenger vehicles 206). The engine vehicle 204 may be configured to determine and transmit instructions based on the status information of the operational and/or emergency attributes and/or parameters received from the passenger vehicles 206.

The engine vehicle 204 may be configured to receive status information of the passenger vehicles 206. The status information of a passenger vehicle may include information related to any of the operational status parameters and/or attributes (e.g., battery status, energy storage status, fuel level, operational range, travel range, operational health, and the like) of the passenger vehicles 206, destination information of the passenger vehicles 206, destination information the peloton, and the like. In some implementations, the passenger vehicles 206 may transmit their operational status information, destination information, and the like to the engine vehicle 204. In some implementations, the passenger vehicles 206 may be configured to transmit the operational status information and/or any emergency status information (e.g., any vehicle component failure, battery failure, brake failure, component temperatures exceeding predetermined temperature thresholds, and the like) periodically to the engine vehicle 204. The periodicity and/or frequency of transmission of information from the passenger vehicles 206 to engine vehicle 204 may be predetermined. In some implementations, the passenger vehicles 206 may transmit the emergency status information in real-time outside of the predetermined periodicity and/or frequency.

The engine vehicle 204, based on the received status information, may be configured to determine and/or identify a set of current values for a set of vehicle attributes (e.g., operational status attributes and/or parameters, emergency status and/or parameters, and the like described above) for each of the passenger vehicles. The engine vehicle 204, based on the determined and/or identified current values of a passenger vehicle 206, may be configured to adjust a position of a corresponding passenger vehicle 206.

The engine vehicle 204 may be configured to adjust a position of a passenger vehicle by causing the passenger vehicle to increase or decrease its speed. For example, the engine vehicle 204 may transmit an instruction and/or a message to the passenger vehicle 206 to increase or decrease its speed, and the passenger vehicle 206 may be configured to increase or decrease the speed in response to receiving the instruction. The engine vehicle 204 and the passenger vehicles 206 may be configured to increase or decrease speed by a predetermined amount.

In some implementations, the engine vehicle 204 may be configured to determine and/or identify a distance between a passenger vehicle and another vehicle (e.g., a passenger vehicle or an engine vehicle) of the peloton based on the operational status (e.g., distance between a first passenger vehicle and another vehicle of the peloton). Based on determined distance, the engine vehicle 204 may determine whether the determined distance fails to satisfy a desired gap size (e.g., gap size 210) between the passenger vehicle and the other vehicle of the peloton 202. The desired gap size (e.g., gap size 210) may be a predetermined gap size between two vehicles of a peloton. In some implementations, the engine vehicle 204 may determine whether the distance satisfies the desired gap size by determining whether the distance satisfies a large gap threshold value or a short gap threshold value. The large gap threshold value may indicate that the size of the gap between the vehicles of the peloton 202 is greater than a desired gap between vehicles of a peloton. Similarly, the engine vehicle 204 may determine whether the determined distance satisfies a short gap threshold value. The short gap threshold value may indicate that the size of the gap between the vehicles of the peloton 202 is less than a desired gap between vehicles of a peloton.

The engine vehicle 204 may be configured to cause the passenger vehicle to increase the speed when the determined distance satisfies the large gap threshold value. Similarly, the engine vehicle 204 may be configured to cause the passenger vehicle to decrease the speed when the determined distance satisfies short gap threshold value. In some implementations, if the size of the gap 210 between multiple sets of vehicles fails to satisfy a desired gap size between two vehicles of the peloton, then the engine vehicle 204 may cause passenger vehicle(s) of a first set to adjust its position (e.g., increase speed or decrease speed) until the size of the gap satisfies the desired gap size.

In some implementations, the engine vehicle 204 may be configured to adjust a position of a passenger vehicle by causing the passenger vehicle to uncouple from the peloton 202. The engine vehicle 204 may be configured to cause a passenger vehicle to uncouple from the peloton if any emergency conditions (e.g., failure of brakes, batteries, wheels, and the like) are satisfied. Similarly, the engine vehicle 204 may be configured to cause a passenger vehicle to uncouple from the peloton a current value of an operational status attribute and/or parameter satisfies a threshold level, For example, if a current fuel level, charge level, energy storage level and the like fails to satisfy a corresponding threshold level. In some implementations, the engine vehicle 204 may be configured to cause a vehicle to uncouple from the peloton if an upcoming virtual station is the virtual station at which a passenger vehicle 206 of the peloton 202 should exit. The engine vehicle 204 may determine whether an upcoming virtual station is the virtual station at which a passenger vehicle should exit based on the destination information of passenger vehicle. In some implementations, the engine vehicle 204 may receive destination information each of the passenger vehicles 206 of the peloton 202. In some implementations, the engine vehicle 204 may receive from a computing hub (e.g., a global computing hub) of the VRR system.

Figure 3:
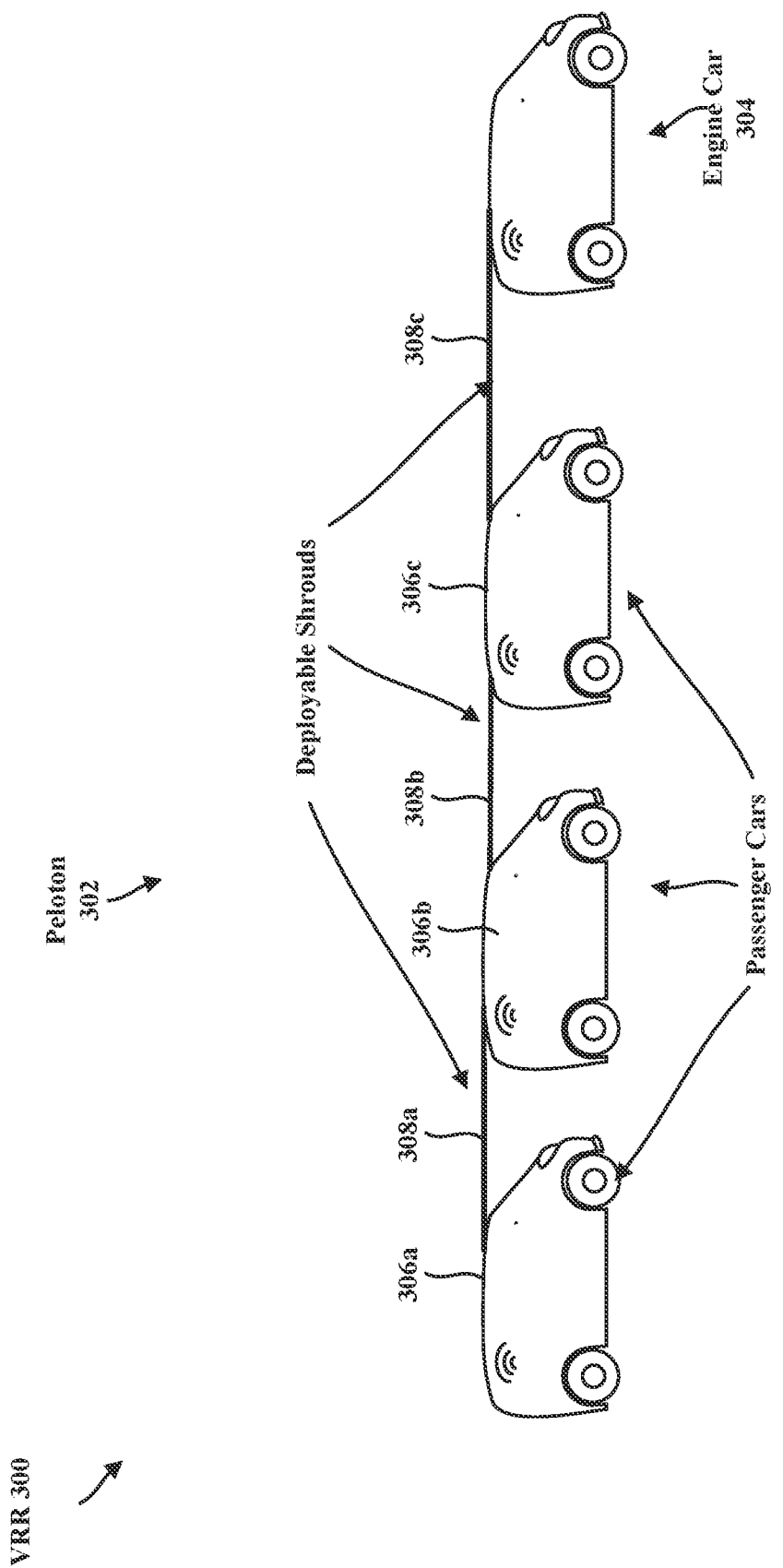
FIG. 3 illustrates an example of a peloton of vehicles, in accordance with various aspects of the present disclosure.

Turning now to FIG. 3, there is shown another example peloton 302 of vehicles of a VRR 300. In FIG. 3, the engine vehicle 304 and/or the passenger vehicles 306a, 306b, 306c, collectively referred to as passenger vehicles 306, may include a deployable shroud. For example, as shown in FIG. 3, engine vehicle 304 may include deployable shroud 308c, passenger vehicle 306c may include deployable shroud 308b, and passenger vehicle 306b may include deployable shroud 308a. The passenger vehicle 306a may include a deployable shroud but the shroud has not been deployed, e.g., is stored in the roof of the vehicle. An engine vehicle 304 and/or the passenger vehicles 306 may be configured to not deploy (e.g., extend) a shroud if another vehicle of a peloton 302 is not following the engine vehicle 304 or a passenger vehicle 306.

The deployable shrouds 308a, 308b, 308c, collectively referred to as deployable shrouds 308, may increase the aerodynamic efficiency of the peloton 302 when the shrouds 308 are deployed. The deployable shrouds 308 may cover the top areas of the gaps between the vehicles of the peloton 302, as shown in FIG. 3. In some implementations, the deployable shrouds 308 may also and/or alternatively cover the sides of the gaps between the vehicles of the peloton 302. In some implementations, the deployable shrouds 308 may comprise one or more stiff panels that are extendible, a flexible fabric material over a rigid extendible frame, and the like. As shown in FIG. 3, the deployable shrouds 308 may extend towards at least one other vehicle of the peloton. For example, as shown in FIG. 3, deployable shroud 308a of vehicle 306b is configured to extend towards vehicle 306a, deployable shroud 308b of vehicle 306c is configured to extend towards vehicle 306b, and deployable shroud 308c of engine vehicle 304 is configured to extend towards vehicle 306a. In some implementations, the engine vehicle 204 may be configured to cause a passenger vehicle to deploy its shroud 308 once a passenger vehicle joins the peloton.

As described above, in some implementations, engine vehicles and/or passenger vehicles may be electric vehicles. For example, engine vehicle 304 may be an electric vehicle and the passenger vehicles 306 may be an electric vehicle, and the corresponding deployable shrouds 308 of these vehicles may include electrical wiring that can electrically connect with a trailing vehicle in an automatic way when a passenger vehicle joins the peloton and electrically disconnect from the trailing vehicle in an automatic way when a passenger vehicle uncouples from the peloton. For example, as a passenger vehicle 306 exits or uncouples from the peloton 302, its electrical connection can be automatically disconnected, and when a passenger vehicle 306 join the peloton 302, their electrical connections can be automatically connected. In this way, all of the passenger vehicles 306 in the peloton 302 may be electrically connected in parallel with the engine vehicle 304. With such electrical connections, in some implementations, the engine vehicle 304 can supply electricity to charge the batteries of the passenger vehicles 306 while they are in the peloton. As such the peloton 302 may be a moving charging station in between destinations.

The electrical connections described above may allow the passenger vehicles 306 to have greater range in the VRR and/or may allow the passenger vehicles 306 to have smaller batteries than they would otherwise. For example, the batteries in the passenger vehicles 306 may be sized smaller such that they are able to make the "last mile" drives to and from the virtual stations of the VRR system, because the passenger vehicles 306 can rely on the peloton 302 as a moving charging station in between destinations. Additional details of the virtual stations are described in FIGS. 5, 6A-6E, and other figures described herein. Although the electrical wiring is described as being included with the shroud structure in some implementations. In some implementations, the passenger vehicles 306 may include a deployable structure comprising electrical wiring without a shroud.

Figure 4:
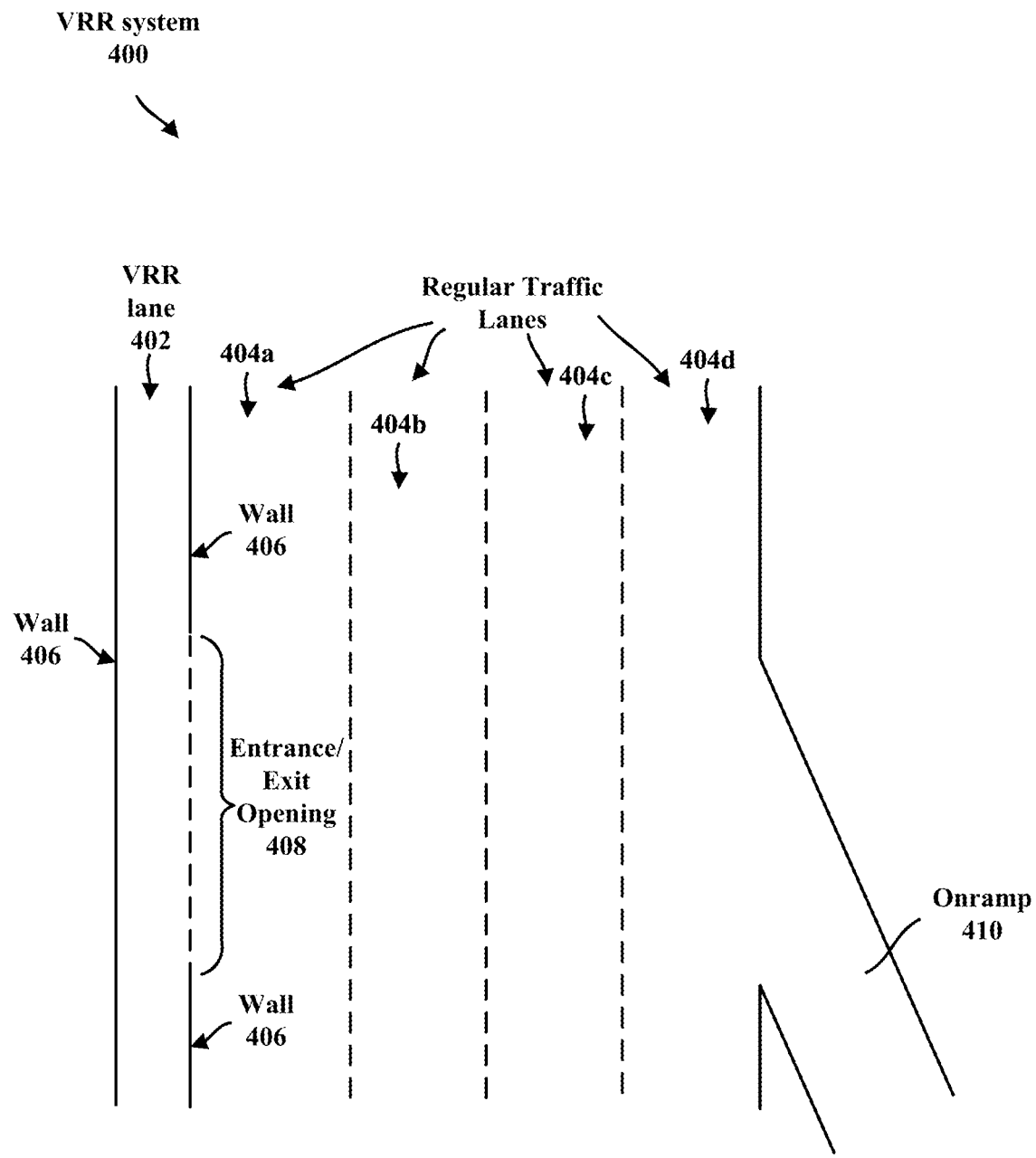
FIG. 4 illustrates an example of a virtual railroad lane, in accordance with various aspects of the present disclosure.

Turning now to FIG. 4, there is shown another example of a VRR lane 402 in a VRR system 400. In some implementations, as shown in FIG. 4, the VRR lane 402 may include a wall 406 on either side of the VRR lane 402. The walls 406 may help isolate the VRR lane 402 from traffic in the regular traffic lanes 404a, 404b, 404c, 404d, collectively referred to as regular traffic lanes 404. Accordingly, the isolation provided by walls 406 can also increase safety of the vehicles traveling in the VRR lane 402. The walls 406 may help isolate the VRR lane 402 from environmental factors (e.g., crosswind, and the like) of the regular traffic lanes 404. Such isolation of environmental factors from the regular traffic lanes 402 may also increase aerodynamic efficiency of the pelotons traveling in the VRR lane 402.

In some implementations, the walls 406 may include gaps, as shown in FIG. 4, to allow for one or more vehicles (e.g., vehicles of pelotons) traveling in VRR lane 402 to exit from a peloton at the wall opening 408. Similarly, at the wall openings 408, the one or more vehicles enter the VRR lane 402 at entrance opening 408 to join a peloton travelling in the VRR lane 402.

Figure 5:
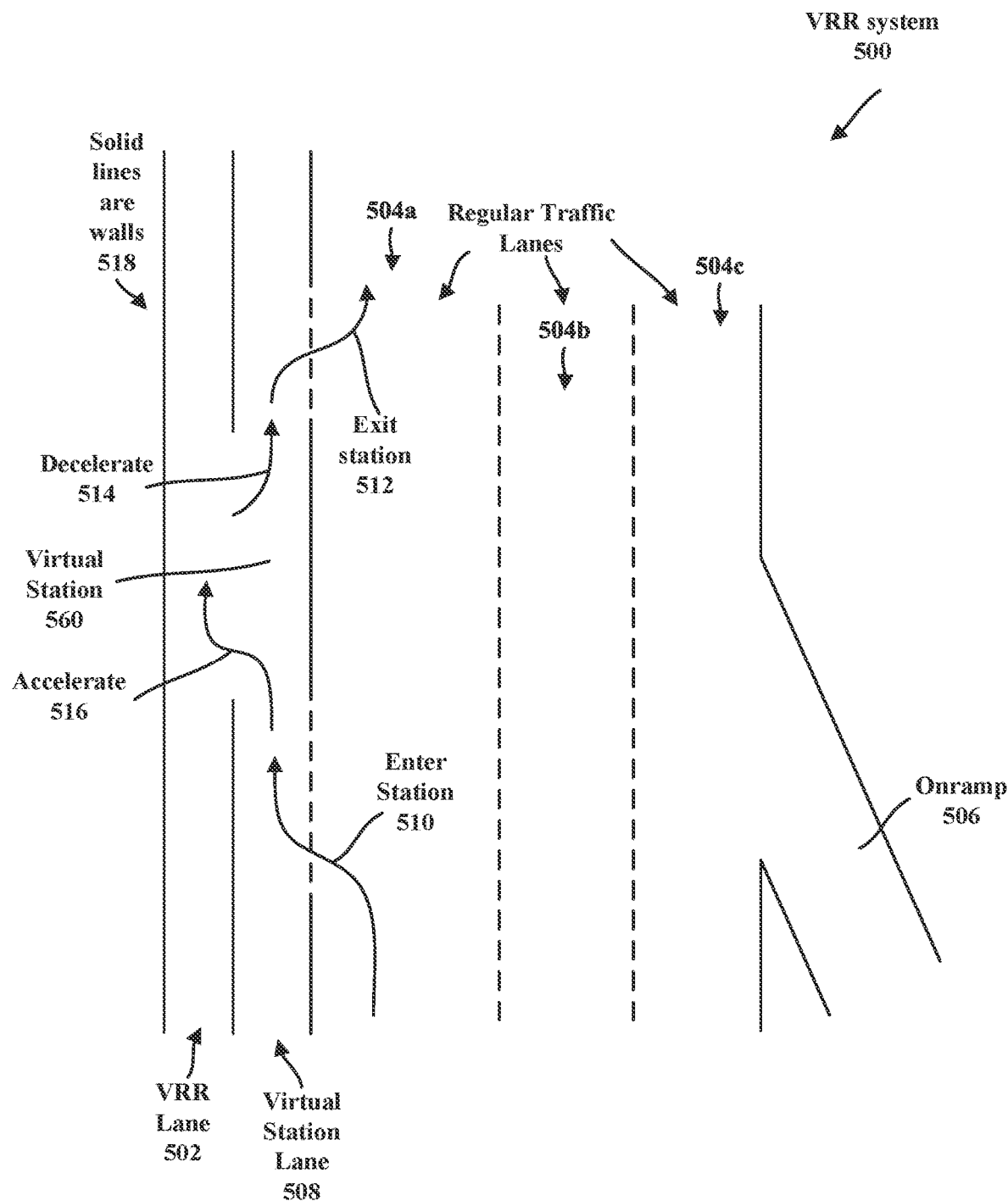
FIG. 5 illustrates an example of a virtual railroad lane and a virtual station, in accordance with various aspects of the present disclosure.

Turning now to FIG. 5, there is shown in a VRR system 500 with a virtual stations. The VRR system 500 includes a VRR lane 502, regular traffic lanes 504a, 504b, 504c, collectively referred to as regular traffic lanes 504, onramp 506. The VRR lane 502 includes walls 518, and the VRR system 500 includes a virtual station lane 508. The virtual station lane 508 may include a virtual station (e.g., virtual station 560). A virtual station (e.g., virtual station 560) of the VRR system allows for vehicles to merge into a VRR lane (e.g., VRR lane 502) and/or join a peloton. In some implementations, the virtual station lane 508 may include walls 518 as shown in FIG. 5. Similar to the walls 406 of FIG. 4, walls 518 of FIG. 5 may include openings 510 and 512.

One or more passenger vehicles or engine vehicles may enter virtual station lane 508 at the wall opening 510 and exit from the virtual station lane 508 at the wall opening 512. In some implementations, the passenger vehicles may enter the virtual station lane 508 and temporarily park at a designated area (not shown in FIG. 5) of the virtual station lane 508. The virtual station lane 508 can provide a dedicated lane for passenger vehicles to accelerate in order to join a peloton travelling on the VRR lane 502. Similarly, the virtual station lane 508 can provide a dedicated lane for passenger vehicles and/or engine vehicles of pelotons in the VRR lane 502 to decelerate after uncoupling from the peloton.

By allowing acceleration and/or deceleration to be performed in a dedicated lane separate from both the VRR lane 502 and the regular traffic lanes 504, the virtual station lane 508 improves safety of the VRR system 500 and the safety for the passengers and the passenger vehicles of the pelotons travelling in lane 502. The virtual station lane 508 may also improve efficiency of peloton of vehicles travelling in the VRR lane 502 by allowing the peloton of vehicles to continue at speed. For example, the peloton may continue to travel at its maximum speed and the one or more passenger vehicles that are exiting from the peloton may uncouple from the peloton and decelerate in the virtual station lane 508 to safely merge into regular traffic lanes 504. Similarly, a vehicle coupling with a peloton traveling in the VRR lane 502 may accelerate in the virtual station lane 508 until the vehicle reaches a speed (e.g., the speed at which the peloton is travelling at) at which it can safely couple with the peloton. Additional details of vehicles coupling with and uncoupling from a peloton are described herein with respect to FIGS. 6A-6E.

Figure 6A:
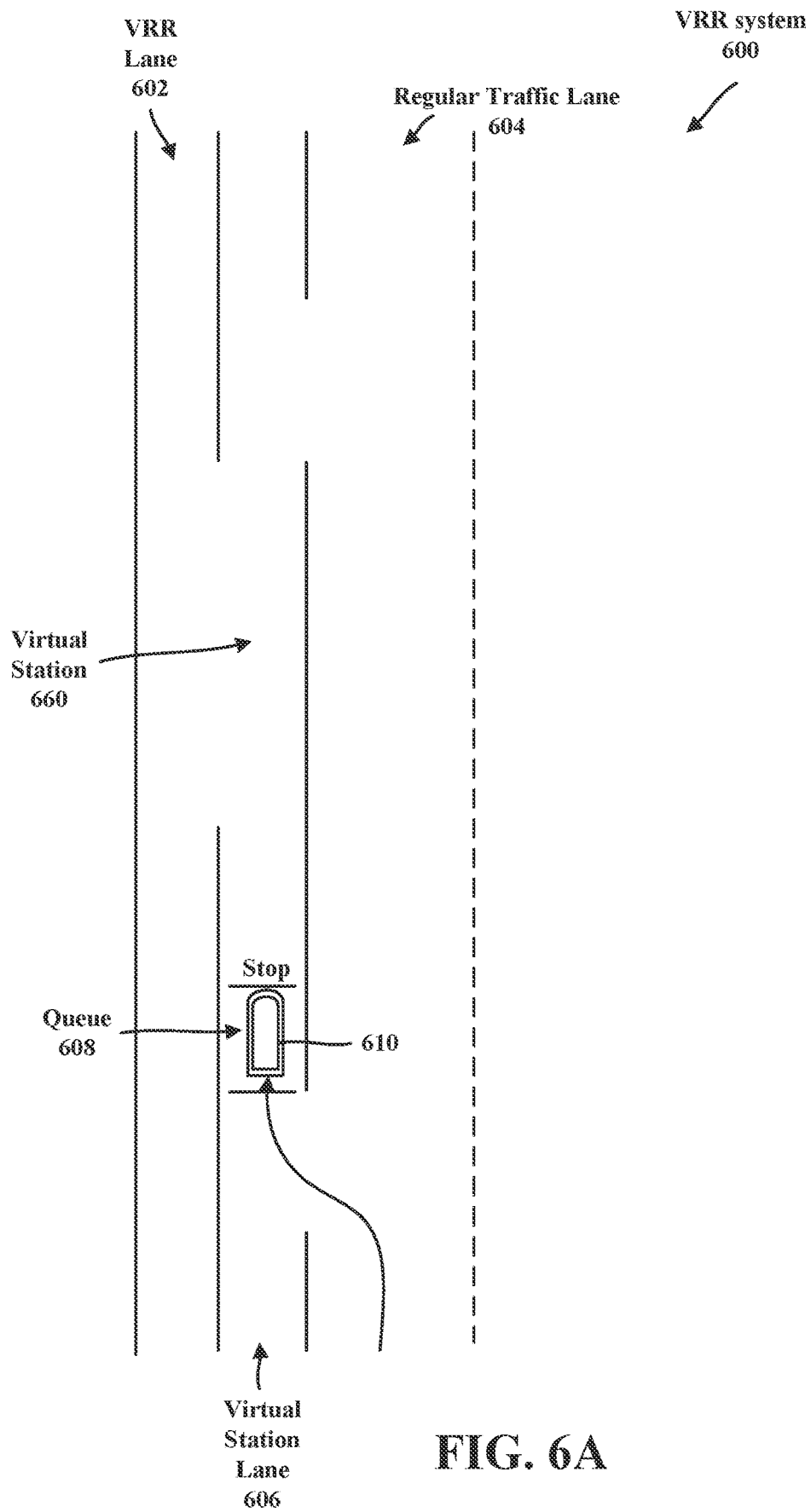
FIGS. 6A-6E illustrates an example of uncoupling and coupling of vehicles with a peloton, in accordance with various aspects of the present disclosure.

Turning now to FIG. 6A, there is shown VRR system 600. VRR system 600 includes a VRR lane 602, one or more regular traffic lanes 604, a virtual station lane 606, virtual station 660. The VRR lane 602 may be configured similarly to the VRR lanes 102, 402, 502, as described above. The one or more regular traffic lanes 604 may be similarly configured as the one or more regular traffic lanes 104, 404, 504. The virtual station lane 606 may be similarly configured as the virtual station lane 508.

The virtual station lane 606 may include a designated area for vehicles to wait before joining a peloton travelling in VRR lane 602. For example, as shown in FIG. 6A, virtual station lane 606 includes a queue area 608 where vehicles, such as vehicle 610, may temporarily park and wait until a peloton travelling in virtual lane 602 is within a threshold distance. The virtual station lane 606 may include an entrance area 660, and the vehicle 610 may enter the virtual station lane 606 via the entrance area 660. The vehicle 610 may enter the virtual station lane 606 from the regular traffic lane 604.

In some implementations, the vehicle 610 may transmit user's destination information (e.g., a destination address) to a global central computing hub (not shown separately) or a local central computing hub (not shown separately) of the VRR system 600. The global or a central computing hub of the VRR system 600 may include one or more computing devices and/or processors that are configured to assign positions to vehicles within a queue 608, within a peloton travelling in the VRR lane 602, and the like. In some implementations, a local central computing hub may be located at a virtual station lane (e.g., virtual station lane 606) of a VRR system (e.g., VRR system 600). A local and/or the global central computing hub may be configured to wirelessly communicate with one or more vehicles in the virtual station lane 606 and/or vehicles of a peloton in the virtual lane 602.

In some implementations, vehicles that enter the virtual station lane 606 may be configured to transmit destination information (e.g., destination address, distance to destination, and the like), operational status information (e.g., current fuel level, current charge level, current battery level, current operational range, current operational health, and the like), and the like, to the global and/or a local central computing hub of the VRR system 600 when the vehicles enter the virtual station lane 606.

Figure 6B:
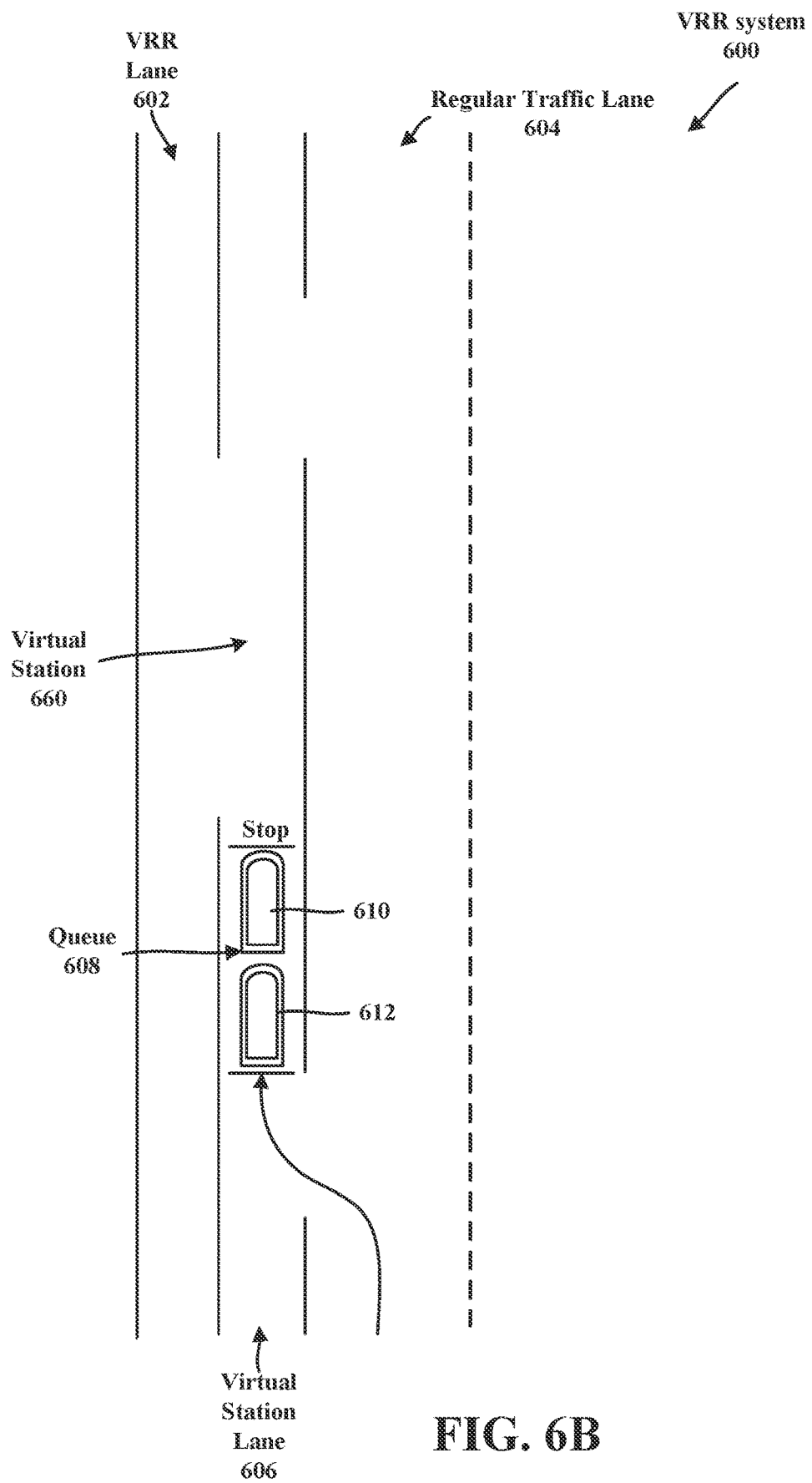

The global and/or local central computing hub of the VRR system 600 may be configured to determine a position for the vehicle 610 within the queue 608. In some implementations, the global and/or a local central computing hub of the VRR system 600 based on the destination information of the vehicles (e.g., vehicle 610) that entered the virtual station lane 606. In some implementations, the global and/or a local central computing hub of the VRR system 600 may determine a distance to the destination of the vehicle 610 from the queue 608, based on the received destination information, and assign a position in the queue area based on the determined distance. In some implementations, the computing hub may determine the virtual station VRR station that the vehicle 610 must exit to get to its destination, and assign a position in the queue based on the exit VRR station. For example, the global and/or a local central computing hub of the VRR system 600 may assign an earlier position in the queue 608 (i.e., a position more forward in the queue) to a vehicle with a larger distance or a later VRR exit station and a later position in the queue 608 (i.e., a position more rearward in the queue) to a vehicle with a shorter distance or earlier exit VRR station. For example, as shown in FIG. 6B, if a distance to destination of second vehicle 612 is shorter than the distance to the destination of the vehicle 610 (or second vehicle 612 will exit at an earlier VRR station than vehicle 610), then the position assigned to the vehicle 612 is greater (e.g., second in the queue 608) and after the position assigned to the vehicle 610 (e.g., first position in the queue 608). In this way, for example, the vehicles can be ordered in the queue so that their relative position in the queue reflects their relative position in the peloton once they join. One advantage of this ordering is the system can ensure that as the peloton is approaching any given VRR station, the vehicle(s) that will exit at that station will be at the trailing end of the peloton. As described in more detail below, this method of ordering can allow the peloton to continue at speed (i.e., does not have to slow down) while allowing exiting vehicles to slow down in the VRR lane before exiting into the virtual station lane of the VRR station.

In some implementations, once a vehicle enters the virtual station lane 606 and/or the queue 608, the global and/or local computing hub of the VRR system 600 may control the movement of the vehicle including, but not limited to, repositioning the vehicle in the queue 608, accelerating the vehicle, decelerating the vehicle, and the like. For example, as shown in FIG. 6B, once vehicle 612 enters the virtual station lane 606 and/or queue 608, the global and/or local computing hub of the VRR system 600 may control the movement of the vehicles 610 and 612.

The global and/or local computing hub of the VRR system 600 can also ensure that the order of vehicles in the queue 608 is in the appropriate order in which the vehicles will join the peloton. For example, if vehicle 612 had arrived at the virtual station 606 before vehicle 610, the VRR system 600 can park vehicle 612 in a temporary spot. When vehicle 610 arrives, the global and/or local computing hub of the VRR system 600 can control vehicle 610 to drive ahead of the parked vehicle 612 to the front of the queue, and then control vehicle 612 to drive from the temporary parking spot to its position behind vehicle 610 in the queue 608. In some implementations, the positions of the vehicles relative to each other in the queue area 608, may correspond to their relative positions when they join the peloton. For example, as shown in FIG. 6B, if both vehicles 610 and 612 are joining the same peloton, then the vehicle 610 in the peloton will be ahead of the vehicle 612 in the peloton.

Figure 6C:
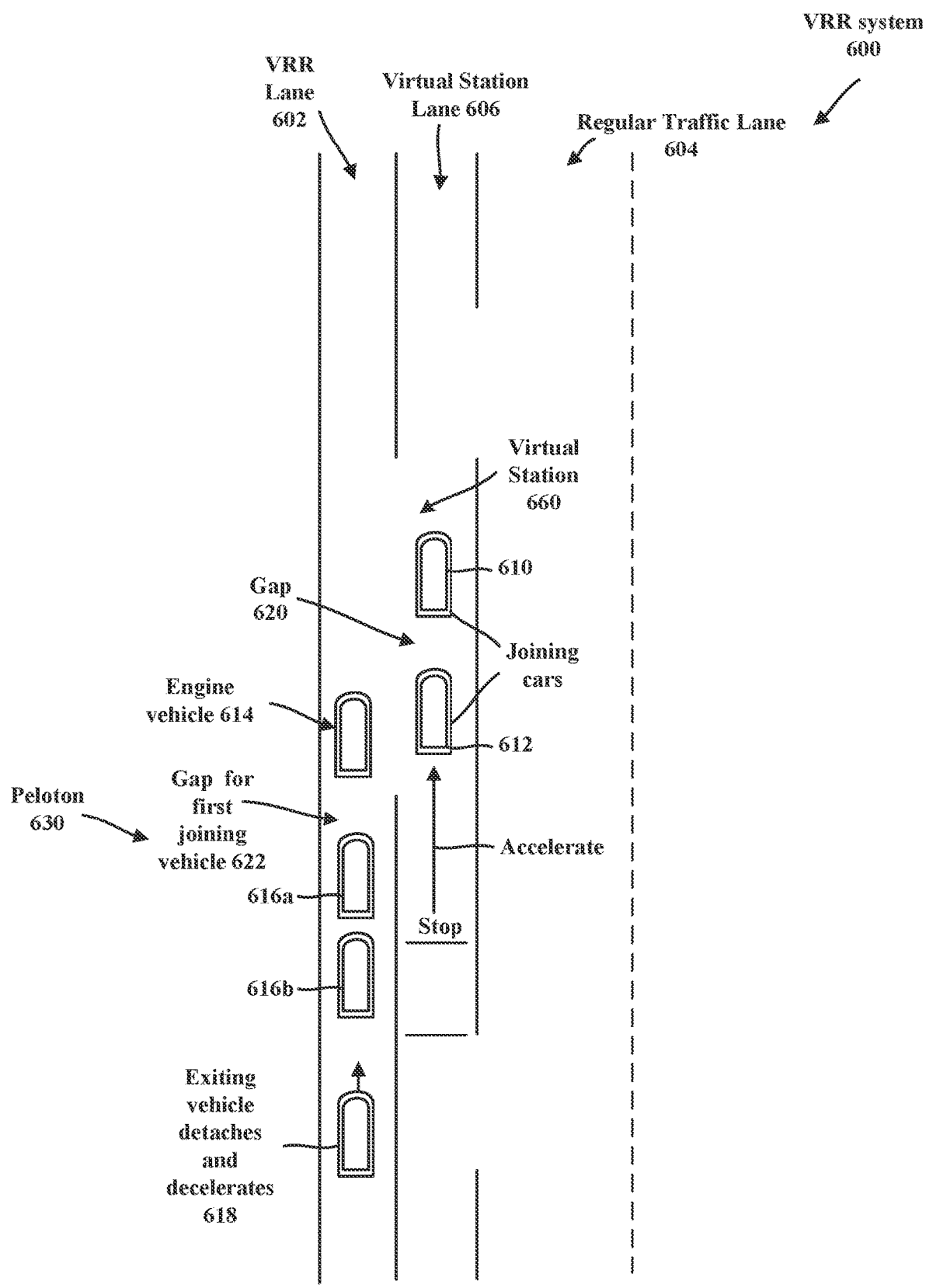

Turning now to FIG. 6C, a peloton 630 is approaching the virtual station of the virtual station lane 606. The peloton 630 includes an engine vehicle 614, and passenger vehicles 616*a*, 616*b*, and 618. The peloton 630 approaches the virtual station at a high speed in the VRR lane 602. Passenger vehicle 618 is uncoupling from the peloton 630. For example, passenger vehicle 618 may be uncoupling from the peloton to exit from the VRR lane 602 because the destination address of the passenger vehicle 618 requires it to exit at this VRR station (e.g., because this VRR station is the closest to the destination, provides the most efficient route, etc.). In some implementations, the engine vehicle 614 may be configured to transmit instructions to the passenger vehicle 618 to uncouple from the peloton and exit from the VRR lane 602 at the virtual station based on the destination address of the passenger vehicle 618. In some implementations, the engine vehicle 614 may be configured to transmit instructions to the passenger vehicle 618 to uncouple from the peloton and exit from the VRR lane 602 based on operational status information (e.g., current fuel level, current charge level, remaining operational range, and the like) of the passenger vehicle 618.

In some implementations, the passenger vehicle 618 may uncouple from the peloton 630 and begin to decelerate in the VRR lane 602. The vehicles in the queue area 608 (e.g., vehicles 610 and 612) that are to join the peloton 630 can begin to accelerate in the virtual station lane 606, as shown in FIG. 6C, to safely join the peloton 630 without the peloton 630 having to slow down and for the peloton 630 to maintain its high speed. The global and/or local computing hub of the VRR system 600 may control the acceleration of the vehicles 610 and 612 such that a gap 620 is created between them, as shown in FIG. 6C. In some implementations, the size of the gap 620 between the vehicles 610 and 612 may correspond to the distance between the vehicles 610 and 612 after they join the peloton 630.

The engine vehicle 614 may receive and/or determine the positions in the peloton 630 at which the vehicles 610 and 612 may join and the engine vehicle 614 may create gaps between the vehicles based on the positions of the vehicles 610 and 612 in the peloton 630. For example, if the position of the vehicle 610 in the peloton 630 is determined to be between the engine vehicle 614 and passenger vehicle 616*a*, then the engine vehicle 614 may create a gap 622 between the engine vehicle 614 and passenger vehicle 616*a* such that the vehicle 610 can merge into the VRR lane 602 and join the peloton 630 by merging into gap 622 between the engine vehicle 614 and the passenger vehicle 616*a*. In some implementations, the engine vehicle 614 may create gaps in the peloton 630 by causing all the vehicles ahead of the desired gap to accelerate. For example, as shown in FIG. 6C, the engine vehicle 614 accelerates and to create the gap 622 between the engine vehicle 614 and the passenger vehicle 616*a*.

Figure 6D:
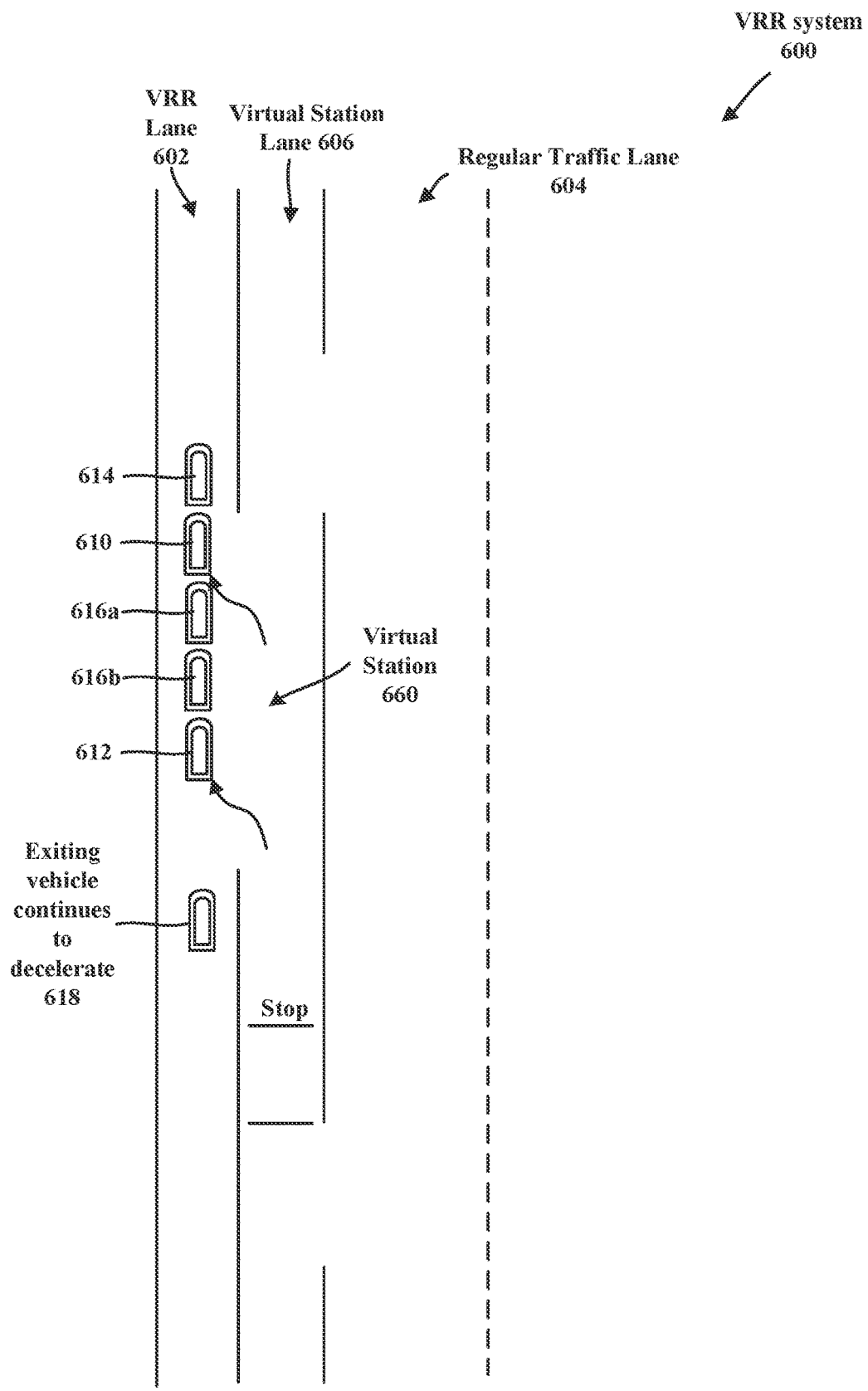

In the example of FIG. 6C, the position of the vehicle 612 in the peloton 630 is at the end of the peloton 630. Therefore, the vehicle 612 will merge into VRR lane 602 and join the peloton 630 by merging behind the vehicle 616*b*. The peloton 630 with the vehicle 610 merged into the position between engine vehicle 614 and the passenger vehicle 616*a*, and the vehicle 612 merged after passenger vehicle 616*b* is shown in FIG. 6D. The peloton 630 with the vehicles 610 and 612 merged into the peloton 630 continues to travel the VRR lane 602. In some implementations, the peloton 630 may travel at least at the same speed as it was travelling prior to the merger of vehicles 610 and 612 into the peloton 630.

Figure 6E:
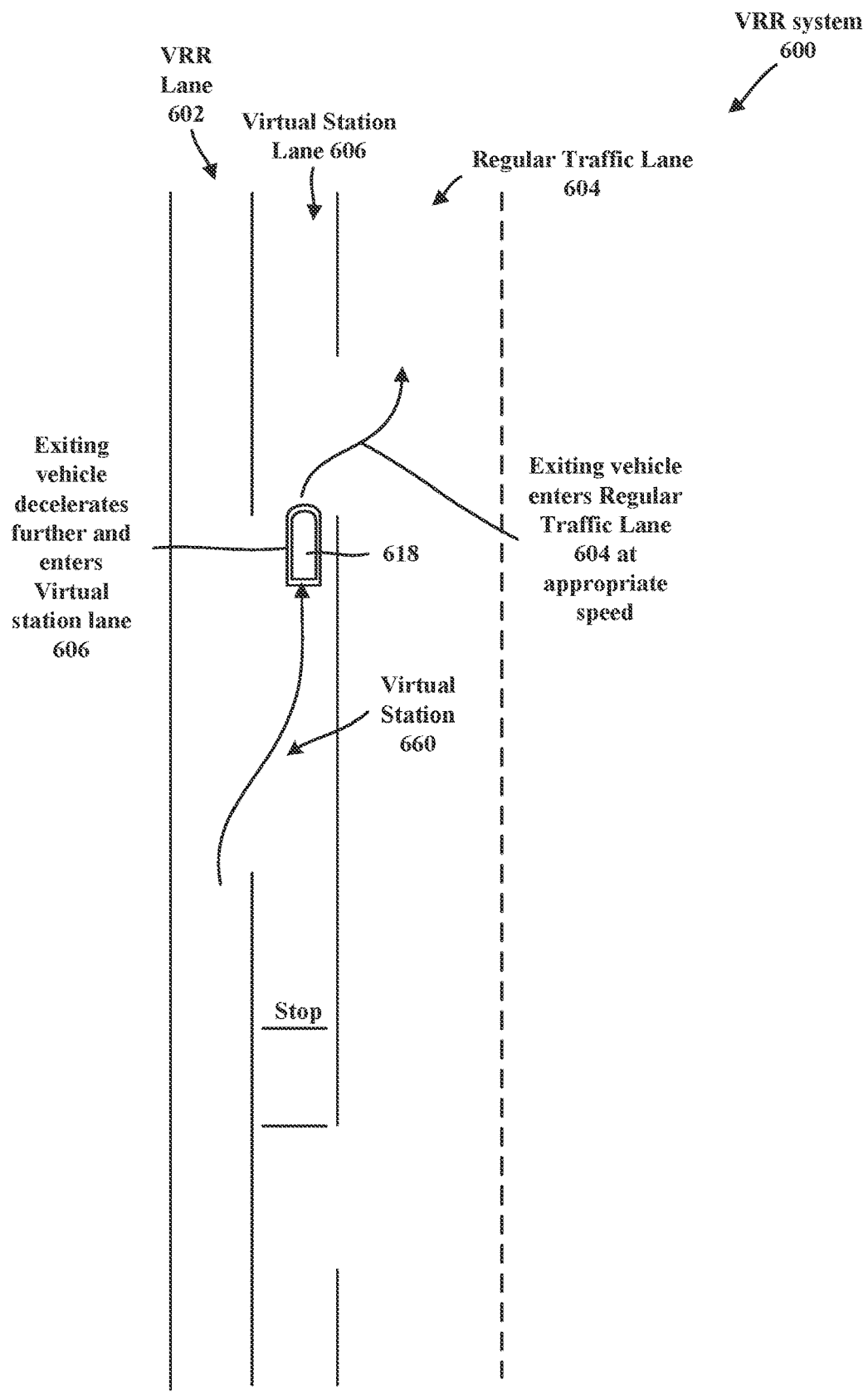

The global and/or local computing hub of the VRR system 600 may control the exiting vehicle 618. For example, the global and/or local computing hub of the VRR system 600 may cause the exiting vehicle 618 to continue to decelerate in the VRR lane 602. The global and/or local computing hub of the VRR system 600 may control the vehicle 618 to exit from the VRR lane 602 into the virtual station lane 606, as shown in FIG. 6E. In some implementations, the global and/or local computing hub of the VRR system 600 may control and cause the vehicle 618 to exit from the virtual station lane 606 into the regular traffic lane 604. The global and/or local computing hub of the VRR system 600 may control the merger of the vehicle 618 at or near regular traffic speed.

In some implementations, the global and/or local computing hub of the VRR system can hand over control of the passenger vehicle to the user while in the virtual station lane 606, after exiting from the VRR lane 602 and after the vehicle has been slowed down to regular traffic speed while still in the virtual station lane. In this way, the virtual station lane 606 can provide a buffer to allow the user to regain control of the vehicle. If the user cannot regain control, for example, the vehicle can continue in the virtual station lane 606 without entering regular traffic (e.g., the virtual station lane can continue beyond the exit opening as an emergency lane). Once the user takes control of the passenger vehicle, the user can merge into the regular traffic lane and continue to drive to the destination.

The techniques described above for creating gaps in a peloton and controlling certain joining vehicles to merge into the gaps allows the VRR system 600 to order the vehicles in the peloton such that vehicles that will exit next are always at the back end of the peloton. This ensures that the procedure described herein can be used for exiting vehicles, i.e., the next-exiting vehicles are always positioned at the back end of the peloton, so that these exiting vehicles can separate from the peloton prior to arriving at a virtual station and can decelerate because the exiting vehicles have no vehicles behind them that are continuing with the peloton. This can allow the rest of the peloton to remain at speed. Therefore, in some implementations, the VRR system 600 can determine where in the peloton to place joining passenger vehicles based on the order in which the vehicles in the peloton will exit at future virtual stations.

In the example shown in FIGS. 6A-E, vehicle 612 is the vehicle that will exit next at a future virtual station. Likewise, vehicle 610 will exit at a later station, so vehicle 610 is placed ahead of vehicle 612 in the peloton order. It should be readily understood that if more than one vehicle will exit next (i.e., at the same virtual station), for example if the vehicle 616*b*, immediately in front of vehicle 612 is exiting at the same virtual station, then both vehicles can separate from the peloton and decelerate. In this case, the VRR system 600 can control the multiple exiting passenger vehicles to decelerate such that the gap between them increases from the distance used in the peloton to a distance that is safe for regular driving (prior to switching control of the vehicles to the drivers).

In some implementations, the virtual station lanes (e.g., virtual station lane 606) of virtual stations may be configured to be long enough such that ordering of the vehicles of a peloton from back to front in order of increasing departure times, distance to destination, distance to target virtual stations, may be avoided. For example, if the virtual station lane 606 extended a great distance, then passenger vehicles of the peloton 630 could uncouple from the peloton 630 and switch into the virtual station lane 606 at high speed, and then decelerate safely in the virtual station lane 606. In this way, the exiting vehicles do not need to be positioned at the back end of the peloton. In some implementations of such an example, the exiting vehicles may exit from the peloton and the VRR lane 602 prior to the joining vehicles accelerating in the virtual station lane 606.

Turning now to FIG. 7, there is shown an example configuration of a wall 702 of a VRR lane of the VRR system. The wall 702 may be similar to the walls described herein with respect to FIGS. 1-10. As described above, the walls of a VRR lane and/or a virtual station lane may include one or more aerodynamic features. As shown in FIG. 7, the inside surface 704 of wall 702 includes aerodynamic features that increase the aerodynamic efficiency of the peloton travelling in the VRR lane. For example, the inside surface 704 of the wall 702 may include aerodynamic features 706, as shown in FIG. 7.

The aerodynamic features 706 may be configured to include dimples which can create a thin layer of turbulence. The thin layer of turbulence may reduce the drag of air flowing over the surface of the wall, and further increase the aerodynamic efficiency of the peloton traveling in the VRR lane between the walls. In some implementations, the sides and/or bottom of engine vehicles, passenger vehicles, and/or other vehicles configured to form a peloton as described herein may include aerodynamic features (not shown separately) which may even further increase the aerodynamic efficiency of the peloton. Such aerodynamic features may be similar to the aerodynamic features 706. For example, the aerodynamic features of the vehicles of a peloton may include dimples.

In some implementations, the aerodynamic features of a wall of a VRR lane and/or a virtual station lane may include openings and/or channels through the wall that may allow air to pass through the wall. For example, the wall may include slats that are angled to create channels that are generally angled in the direction of peloton travel (e.g., 30 degrees from the direction of travel) that can allow air pushed forward by the engine vehicle to escape the VRR lane through the walls, while generally disrupting crosswinds and preventing winds from entering perpendicular to the VRR lane. In some implementations, the slats can be angled generally opposite the direction of peloton travel (e.g., 60 degrees from the direction of travel) to allow air outside the VRR lane to be pulled into the VRR lane, as the peloton passes, to mitigate a drop in air pressure behind the peloton. Additional details of such openings and/or channels in a wall of a VRR lane and/or a virtual station lane are described herein with respect to FIGS. 8A-8C.

Figure 8A:
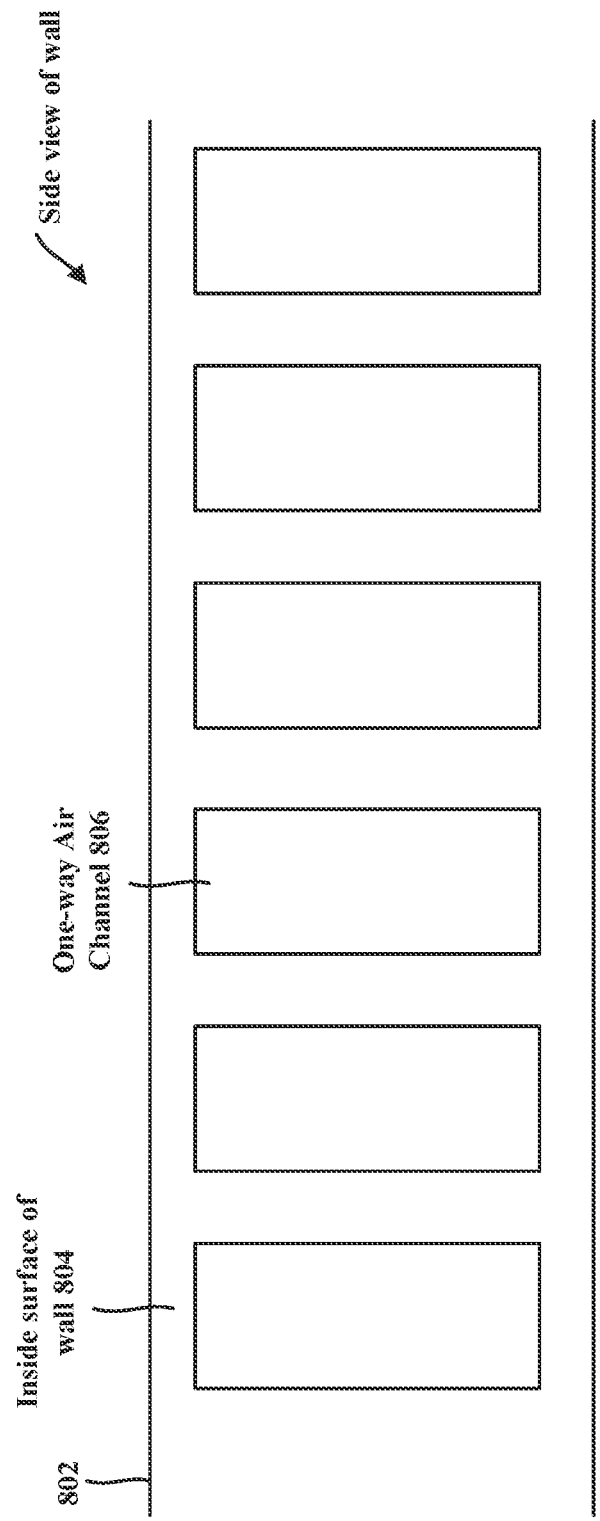
FIG. 8A-8C illustrates an example configuration of a wall of virtual railroad lane, in accordance with various aspects of the present disclosure.

In FIG. 8A, there shown a side view of a wall 802. The inside surface of the wall 802 may include a channels 806. The channels 806 may be one-way air channels that allow air to flow through the wall away from the VRR lane, but do not allow air to flow through the wall into the VRR lane. The details of the one-way valves inside the air channels 806 are shown in FIG. 8B.

Figure 8B:
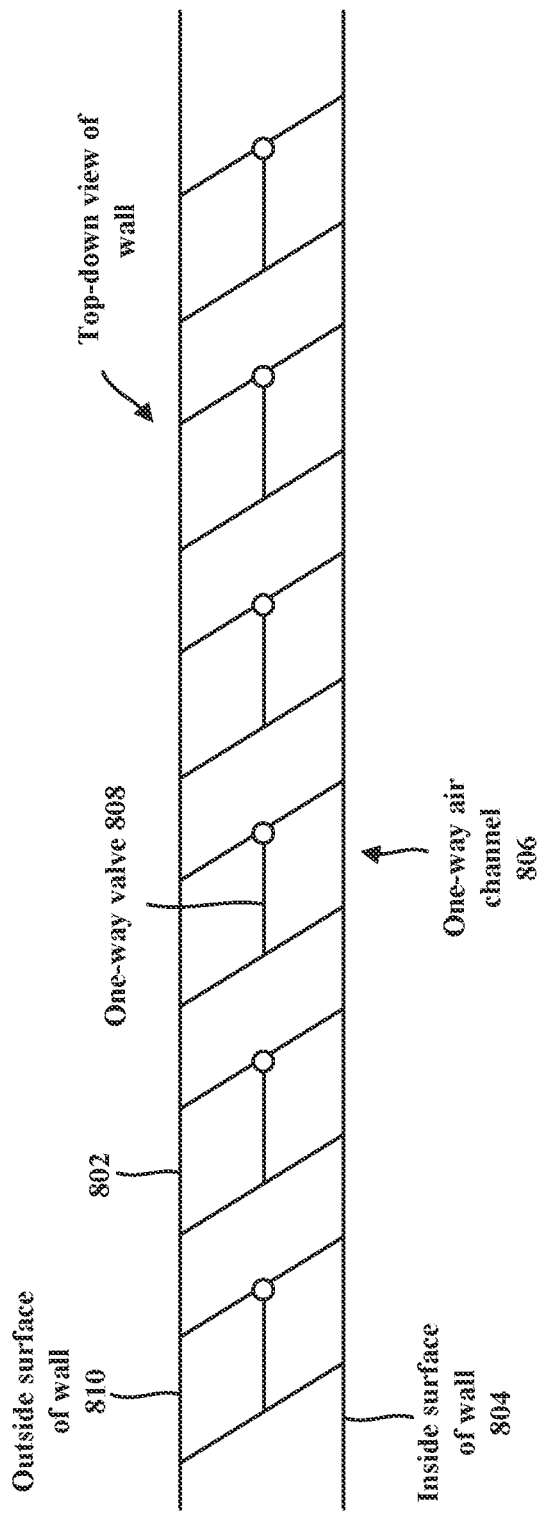

In FIG. 8B, there is shown a top-down view of the wall 802. As shown in FIG. 8B, in some implementations, the one-way air channel may be positioned between the outer surface 810 of the wall 802 and the inner surface 804. The one-way valve 808 of the air channel 806 may include flaps on hinges and are configured to rotate outward (e.g., to an open position) to open the air channel 806 and rotate inward (e.g. to a close position) to close the air channel 806. In FIG. 8b, the one-way valves 808 are shown in their closed positions.

Figure 8C:
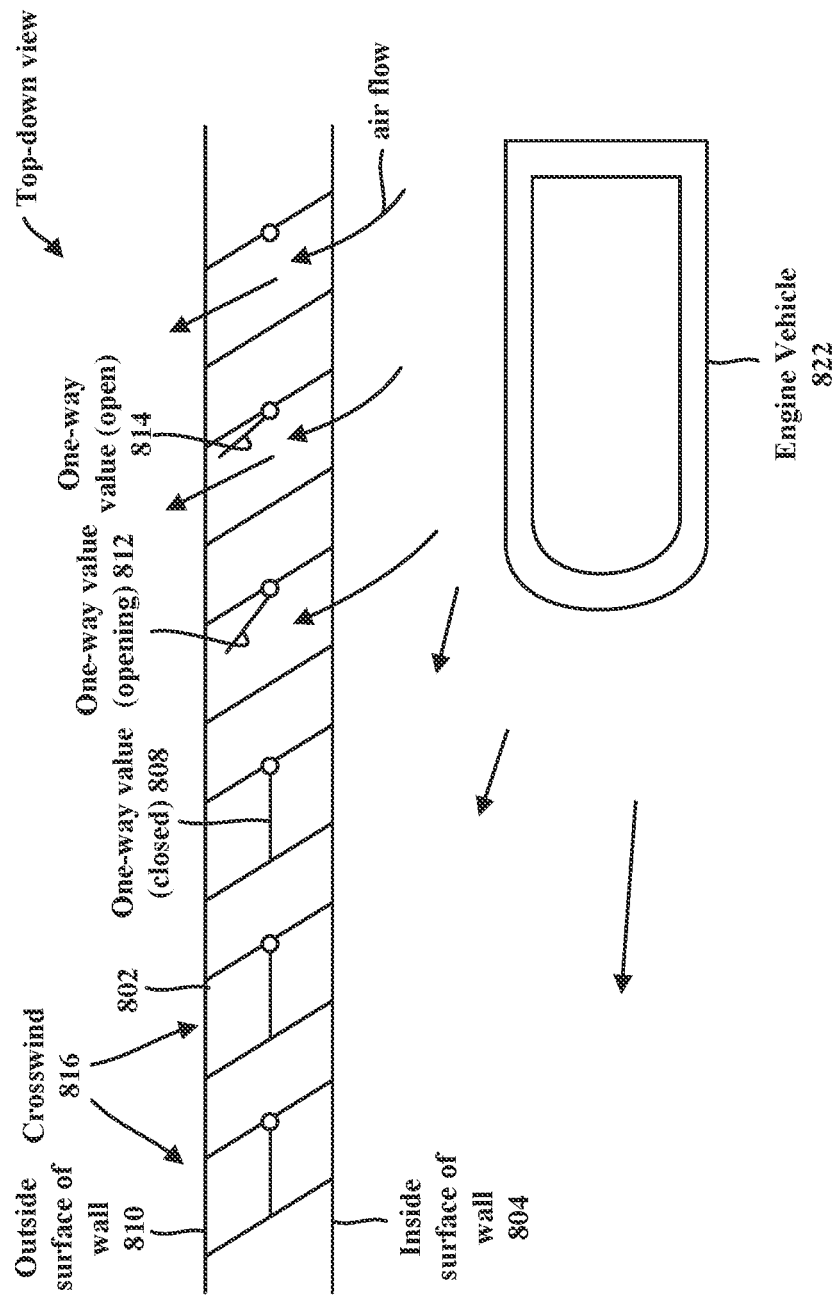

FIG. 8C illustrates the operation of the one-way valves as a peloton is passing in the VRR lane. The air being pushed forward and to the side of the engine vehicle 822 can exert pressure on the one-way valves (e.g., one-way valves 808, 812, 814) to open the valves and allow the air to escape easily from the VRR lane. This can lower the wind resistance facing the peloton in the VRR lane. The one-way valves (e.g., one-way valves 808, 812, 814) can be configured to close automatically after the peloton passes (e.g., the flaps can be spring-loaded to return to the closed position). On the other hand, a crosswind 816 blowing on the outside surface 810 of the wall 802 cannot open the one-way valves. Thus, the wall 802 may completely block crosswinds while allowing air to escape from the VRR lane to aid the peloton aerodynamically.

Figure 9:
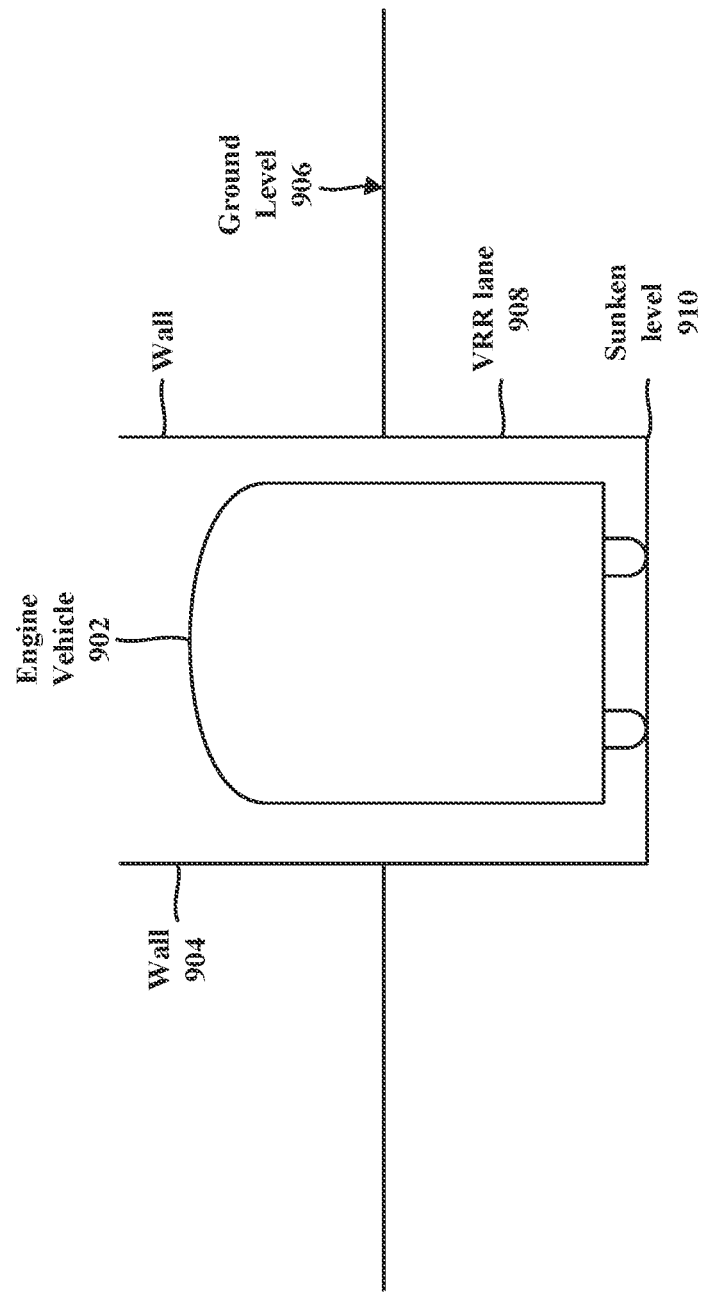
FIG. 9 illustrates an example configuration of a virtual railroad lane, in accordance with various aspects of the present disclosure.

Turning now to FIG. 9, there is shown an example configuration of a VRR lane. In some implementations, as shown in FIG. 9, a VRR lane of a VRR system can be sunken, i.e., below ground level. In FIG. 9, VRR lane 908 may be, for example, a sunken track. In this embodiment, the VRR lane 908 may be sunken to a sunken level 910, and below the ground level 906. In some implementations, a wall 904 of the VRR lane 908 may be configured to have a depth as until the sunken level 910. This sunken track 908 may further increase the aerodynamic efficiency of the peloton as well as the safety of the VRR system because the high-speed pelotons can be further isolated from regular traffic.

As mentioned above, the VRR system can include a global and/or a local central computing hub to control various aspects of the system. The global and/or a local central computing hub of the VRR system may include computer(s) controlling the VRR system and that are configured to performs various functions such as scheduling and coordinating user trips. For example, the global and/or a local central computing hub of the VRR system can receive trip information from user, including user starting location and destination location, and provide the user with one or more options for joining scheduled pelotons, including timing and route information to the virtual station. The global and/or a local central computing hub of the VRR system can utilize various map and traffic software and services to estimate when the user should depart from their origination location and drive to, e.g., the closest virtual station in time to meet and join a peloton in the regular schedule. The global and/or a local central computing hub of the VRR system may give the user various options of times/routes, for example, and may automatically update based on when the user departs from the origination location, if the user gets stuck in unexpected traffic, etc. For example, if the user is driving to the virtual station to join a peloton scheduled to pass by at 1 pm, but the user is delayed (e.g., by unexpected traffic) while driving to the virtual station and will not be able to reach the virtual station in time to join the scheduled peloton, the global and/or a local central computing hub of the VRR system may automatically indicate that the user must join a later-scheduled peloton based on the new arrival time at the virtual station, e.g., a peloton scheduled to pass by at 1:30 pm.

In some implementations, the global and/or a local central computing hub of the VRR system can detect or otherwise obtain information of the current fuel level, current charge level, and the like of the user's passenger vehicle prior (e.g., the passenger vehicle may transmit fuel level information to the user's cell phone, which relays the information to the global and/or a local central computing hub of the VRR system) prior to scheduling the trip and determine whether the user must add fuel before allowing the user to join a peloton. This might prevent users from entering a peloton with inadequate fuel to complete the journey and/or prevent the passenger vehicle from running out of fuel in between virtual stations, which might cause an interruption of VRR service while the stranded vehicle is removed from the VRR lane. Similarly, in some implementations, the global and/or a local central computing hub of the VRR system can monitor the passenger vehicle's fuel level or charge level while in the peloton, and if the fuel level/range drops below a threshold the computer system can require the vehicle exit the peloton before the vehicle runs out of fuel. For example, the computer system can determine the vehicle's current fuel level/range, determine fuel stations near one or more upcoming virtual stations, and give the user options for different combinations of virtual station and fuel station the user would like to use. For long journeys in particular, the global and/or a local central computing hub of the VRR system can determine appropriate virtual station/fuel station combinations ahead of time to allow the user time to consider which combination to use.

In some implementations, the global and/or a local central computing hub of the VRR system may monitor the health and/or fuel level of the engine vehicle and the passenger vehicles in a peloton. If the global and/or a local central computing hub of the VRR system detects an imminent failure in a passenger vehicle, for example, the global and/or a local central computing hub of the VRR system can command passenger vehicle to exit the peloton at the next virtual station, and may also provide information of service stations near the virtual station.

In some implementations, if the global and/or a local central computing hub of the VRR system detects an imminent failure in the engine vehicle, it may take various actions. For example, the global and/or a local central computing hub of the VRR system may command the engine vehicle and the entire peloton to exit at the next virtual station, and command the passenger vehicles to detach from the engine vehicle and await the next passing peloton to join. In some implementations, if the global and/or a local central computing hub of the VRR system determines the failure will not occur soon or the global and/or a local central computing hub of the VRR system determines the engine vehicle is running low on fuel, the computer global and/or a local central computing hub of the VRR system may dispatch another engine vehicle to meet with the peloton and "hot swap" with the ailing engine vehicle without slowing the peloton. For example, a variation of the method of joining a peloton described above may be used. Additional details of hot swapping an engine vehicle of a peloton with a new engine vehicle is described herein with respect to FIGS. 10A-10F.

Figure 10A:
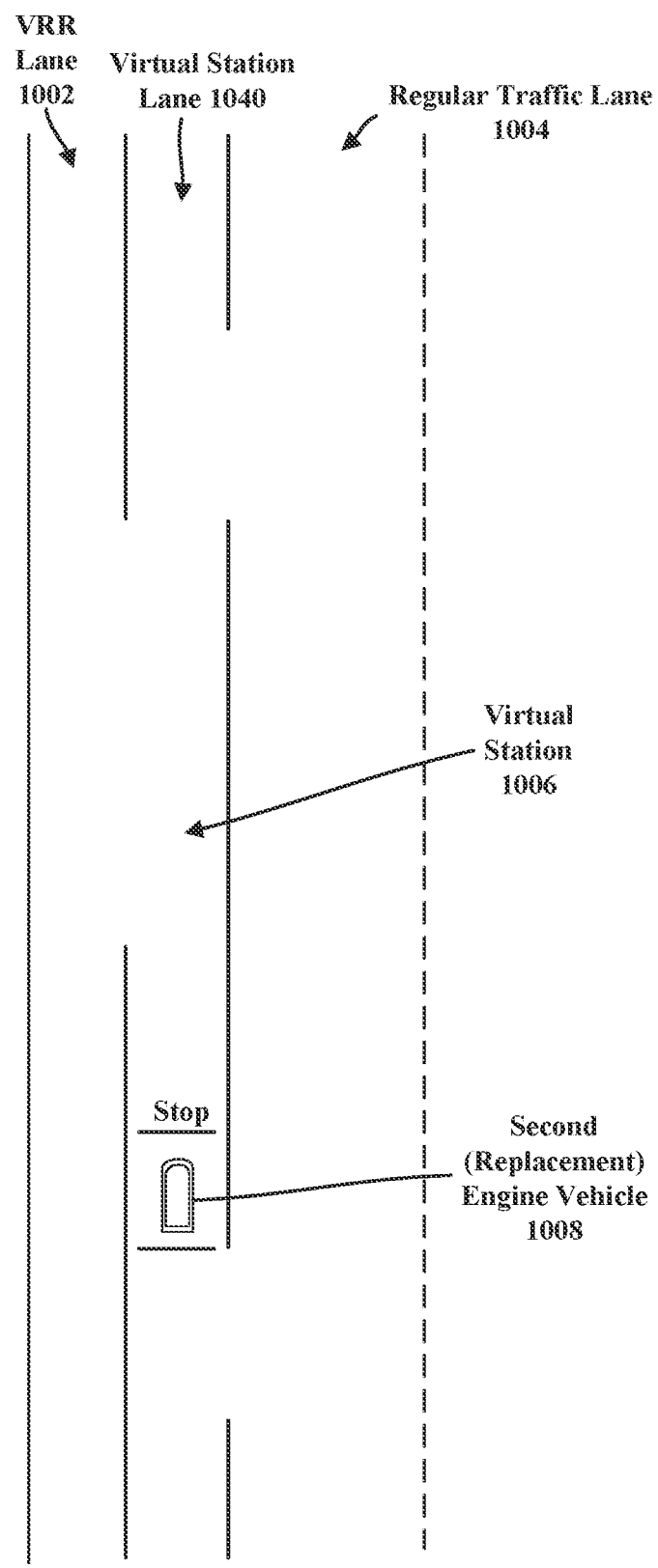
FIG. 10A-10F illustrate an example swapping of engine vehicles, in accordance with various aspects of the present disclosure.

Turning now to FIGS. 10A-F, there is shown an example "hot swap" of engine vehicles. As described above, a hot swap may be used, for example, when the fuel or charge level of an engine vehicle gets low during operation (or when a non-imminent failure of the engine vehicle is detected). As shown in FIG. 10A, for example, a second (i.e., replacement) engine vehicle 1008 may be dispatched to a virtual station to await the peloton with the engine vehicle that has low fuel (the first engine vehicle), travelling in VRR lane 1002.

Figure 10B:
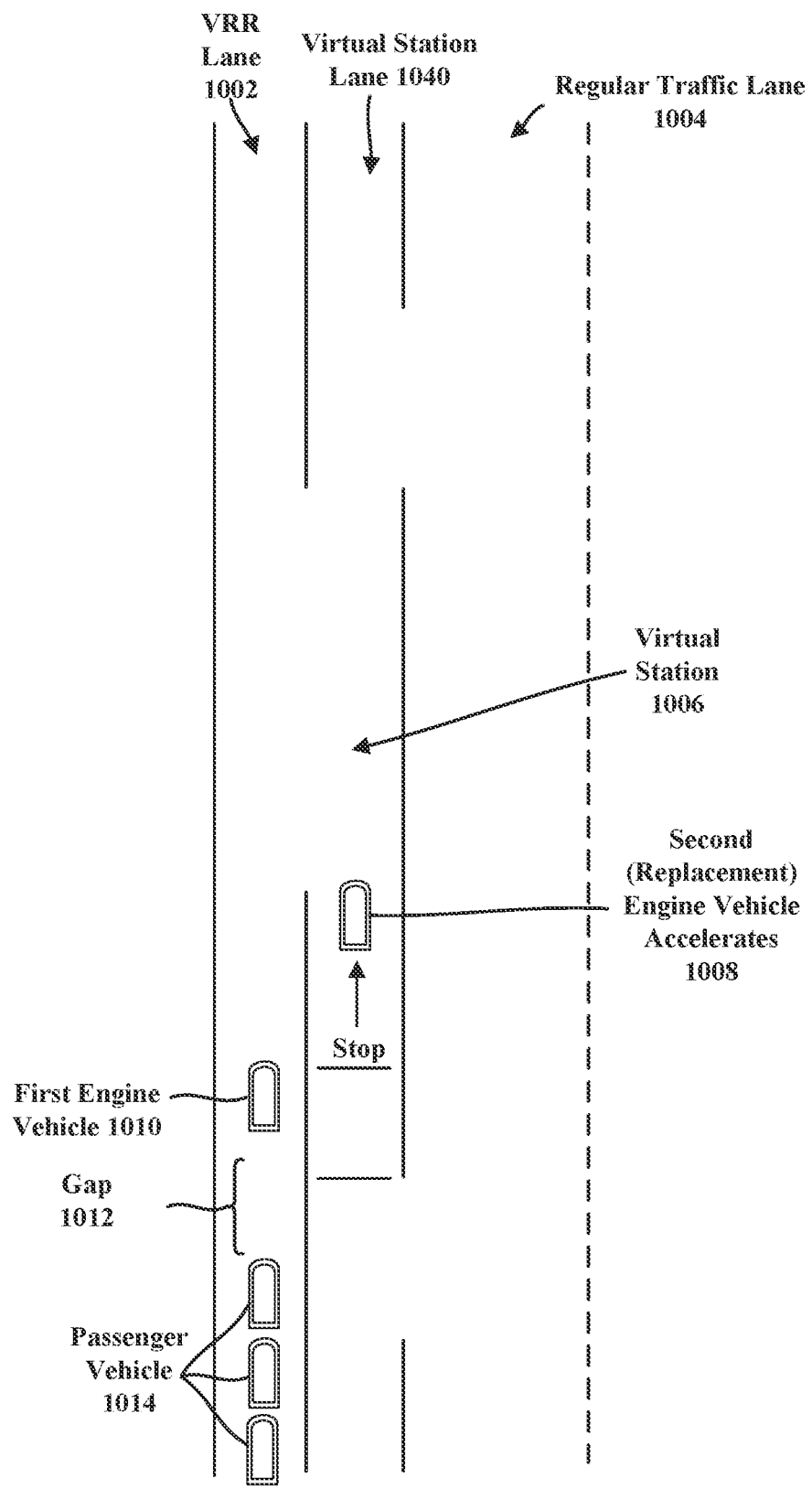
Figure 10C:
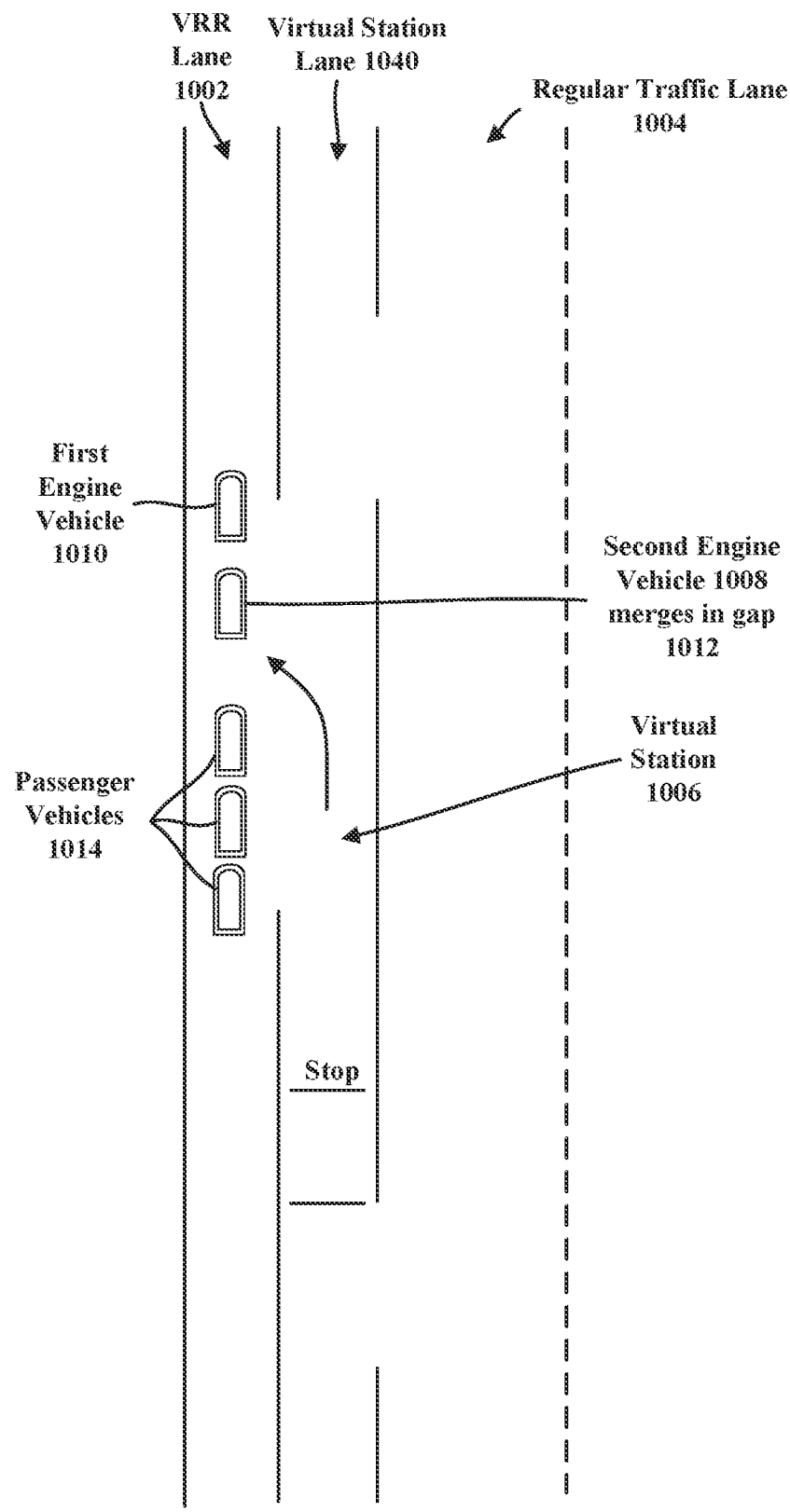
Figure 10D:
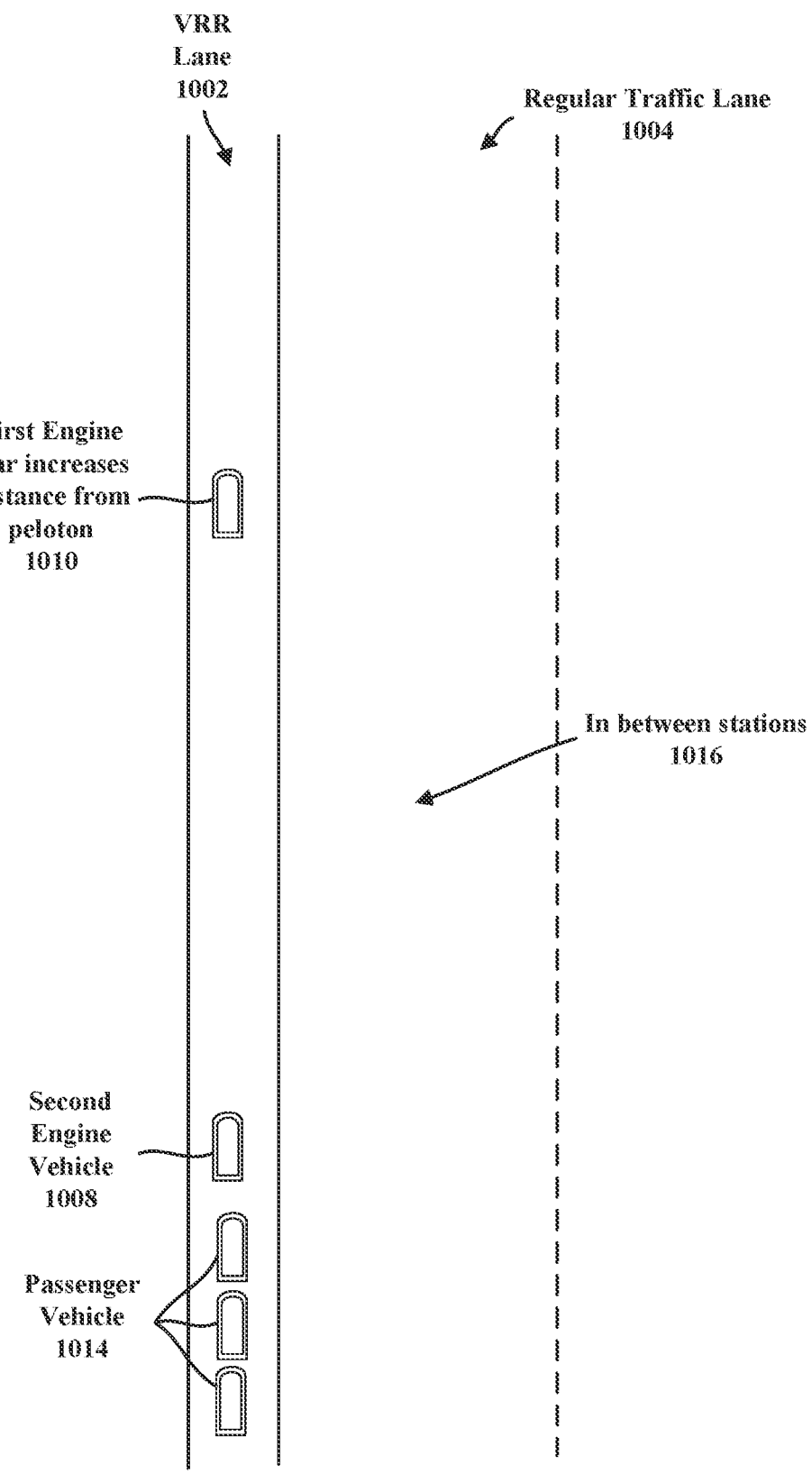

As shown in FIG. 10B, as the peloton approaches the virtual station 1006, the first engine vehicle 1010 increases the gap between itself and the first passenger vehicle in the peloton. The second engine vehicle 1008 accelerates in the virtual station lane. Turning to FIG. 10C, the second engine vehicle 1008 accelerates to the speed of the peloton then merges into the VRR lane into the gap 1012 between the first engine vehicle 1010 and the passenger vehicles 1014. As shown in FIG. 10D, in between (1016) the virtual station 1006 and the next virtual station, the first engine vehicle 1010 separates from the peloton and increases its distance from the second engine vehicle 1008. In some implementations, this may be accomplished by the first engine vehicle 1010 increasing its speed to go faster than the peloton. In this way, the peloton can maintain its high speed. In some implementations, the separation can be accomplished by the first engine vehicle remaining at its speed, and the second engine vehicle decreasing the speed of the peloton to allow the first engine vehicle to separate and move ahead. In some implementations, a combination of the first engine vehicle accelerating and the second engine vehicle decelerating may be used.

Figure 10E:
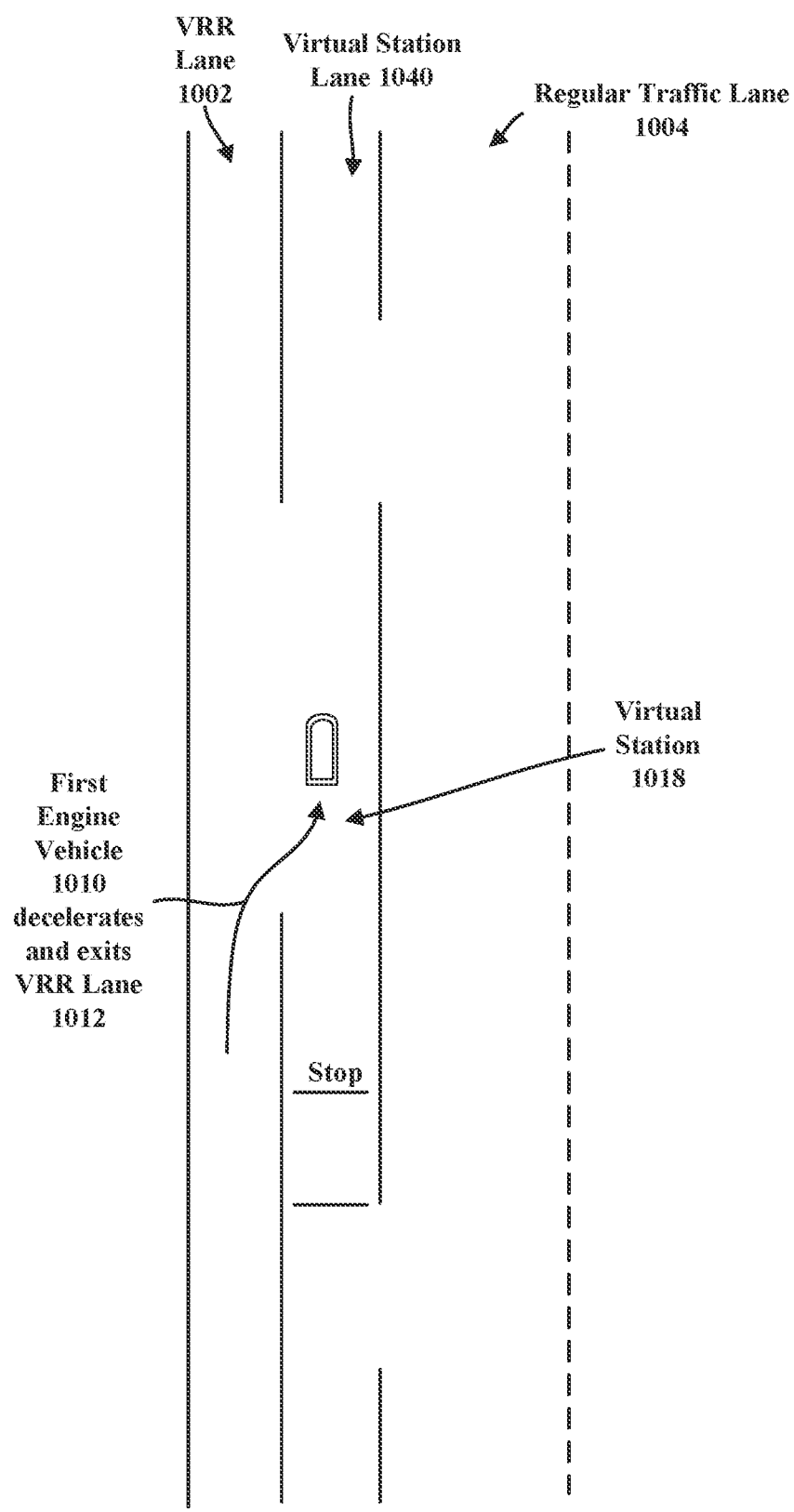
Figure 10F:
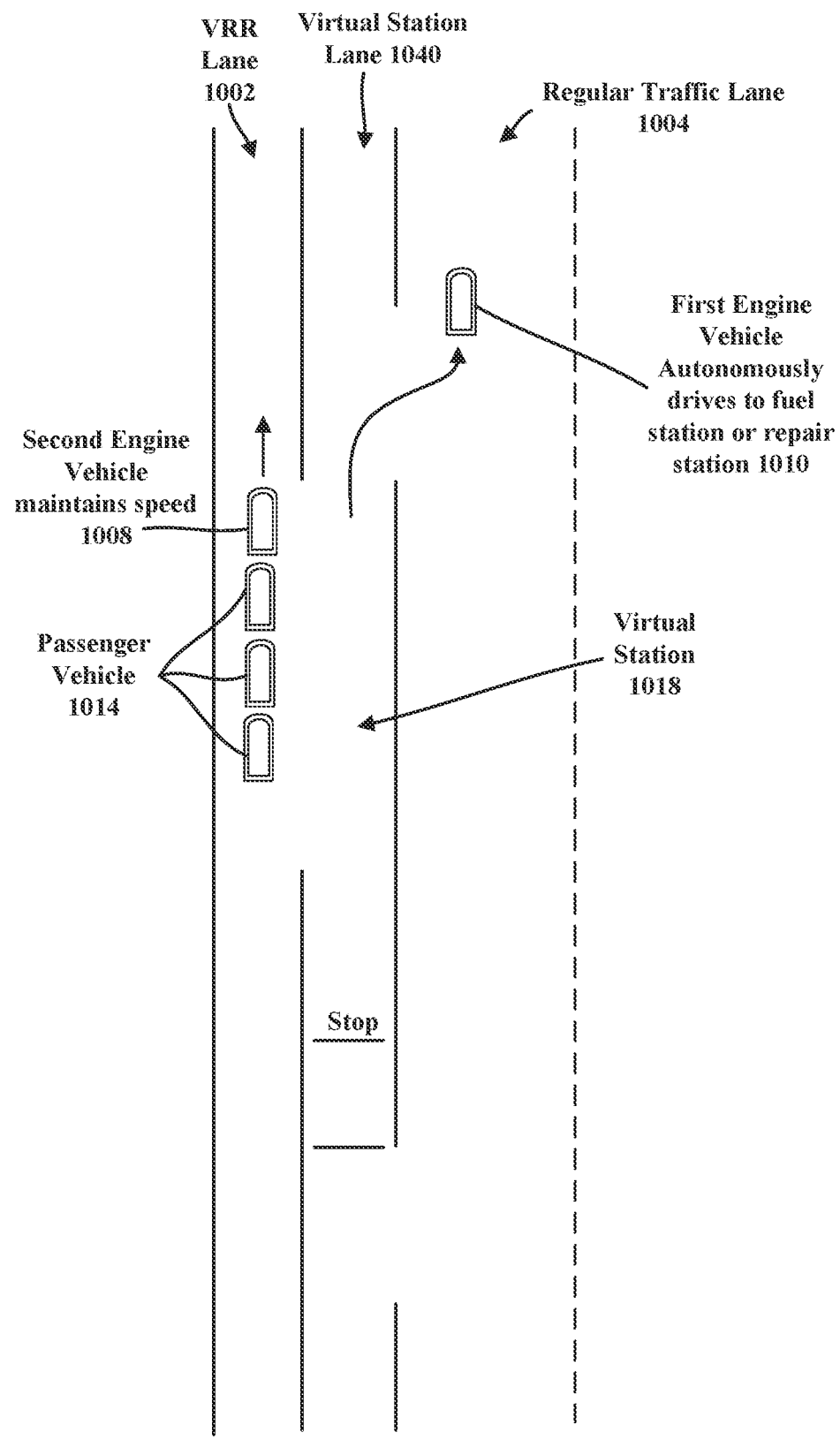

Once the first engine vehicle is far enough ahead of the peloton, it can have room to decelerate and exit the VRR lane at a safe speed. As shown in FIG. 10E, as the first engine vehicle approaches the next virtual station, the first engine vehicle 1010 can decelerate to a safe speed and exit the VRR lane 1002 before the second engine vehicle 1008 arrives with the peloton. FIG. 10F shows the peloton led by the second engine vehicle 1008 passing the next virtual station at high speed, while the first engine vehicle 1010 can exit the virtual station lane 1002 and merge into regular traffic lanes 1004. The first engine vehicle 1010 may be configured to, for example, autonomously drive to a refueling station (or a service station if needed). In this way, a hot swap of engine vehicles may be accomplished to allow the peloton to continue uninterrupted at high speed.

While not shown in the FIGS. 10A-10F, one skilled in the art should appreciate that passenger vehicles may exit and enter the VRR lane during the hot swap technique described FIGS. 10A-10F, at either virtual station (i.e., the hot swap does not interrupt normal service). For example, referring back to FIG. 10A, passenger vehicles may wait in the queue behind the second engine vehicle 1008. As the second engine vehicle accelerates, the one or more passenger vehicles behind the engine vehicle may also accelerate and merge with peloton at appropriate positions in the peloton.

Similarly, exiting passenger vehicles will have separated from the peloton and decelerated prior to the arriving at the virtual station, and can exit as described above. Likewise, at the next virtual station, the first engine vehicle may decelerate and exit the VRR lane prior to the acceleration and merging of any passenger vehicles waiting in the queue, and exiting vehicles may follow the same separation and deceleration procedure described above with respect to FIGS. 6A-6F. Thus, the hot swap procedure does not interrupt normal service of the VRR or the VRR system.

In some implementations, refueling can be accomplished in real time (i.e., while the engine vehicle is operating). For example, referring back to FIGS. 10A-10F, a refueling vehicle can enter the VRR lane 1002 ahead of the peloton, allow the peloton to catch up, refuel the first engine vehicle 1010, and exit the VRR lane 1002 using a method similar to the method used for the first engine vehicle to exit in the hot swap techniques described in FIGS. 10A-10F.

As described above, the global and/or a local computing hub of the VRR system described herein may schedule passenger vehicles and/or determine positions for the passenger vehicles in a peloton based on one or more factors. In some implementations, in addition to or instead of scheduling passenger vehicles for a peloton or determining positions in a peloton based on users' originating and destination locations, current fuel level, current charge level, current operational range, and the like, the global and/or a local computing hub of the VRR system, may schedule the passenger vehicles for pelotons and/or determine positions within a peloton based on a range and/or commonality of destinations.

For example, if the global and/or a local computing hub of the VRR system determines that there are multiple users who wish to travel to the same or similar destination, the global and/or a local computing hub of the VRR system may schedule these users to be in the same peloton. For example, if the global and/or a local computing hub of the VRR system determines multiple Los Angeles users wish to travel to Las Vegas at approximately the same time, the system may schedule all the users to join the same peloton to Las Vegas. In this way, for example, the number of vehicles exiting and entering the peloton during the trip may be minimized, i.e., the number of merges may be minimized during the journey. The minimized merges may further improve the safety of the peloton, and the minimized merges may further improve energy efficiency of the vehicles of the peloton because the peloton, for example, can maintain its tight configuration without having to create gaps for merging.

In some implementations, the global and/or a local computing hub of the VRR system may be configured to determine scheduling of vehicles to a peloton and/or positions within a peloton based on energy efficiency. For example, if use of the VRR is below a threshold usage level (e.g., light usage), the global and/or a local computing hub of the VRR system may eliminate one or more scheduled engine vehicle routes and consolidate users into fewer, but longer, pelotons.

In some implementations, the global and/or a local computing hub of the VRR system may coordinate aspects at the user's destination, such as parking. For example, the global and/or a local computing hub of the VRR system may include sensors at one or more parking structures or locations near the user's destination and/or receive data from sensors near one or more parking structures or locations near the user's destination to detect parking capacity, and allow users to reserve parking at corresponding parking structures or locations near the user's destination.

Although this disclosure refers to the vehicles utilizing the VRR as "passenger vehicles," one skilled in the art should appreciate that the vehicles utilizing the VRR may be any type of vehicles including, but not limited to, cargo vehicles, passenger vehicles, other kinds of vehicles, and the like. In some implementations, a VRR may be used by passenger, cargo, and other types of vehicles at the same time. In some implementations, vehicle utilizing the VRR may be may be fully autonomous, partially autonomous, or not autonomous.

Figure 11:
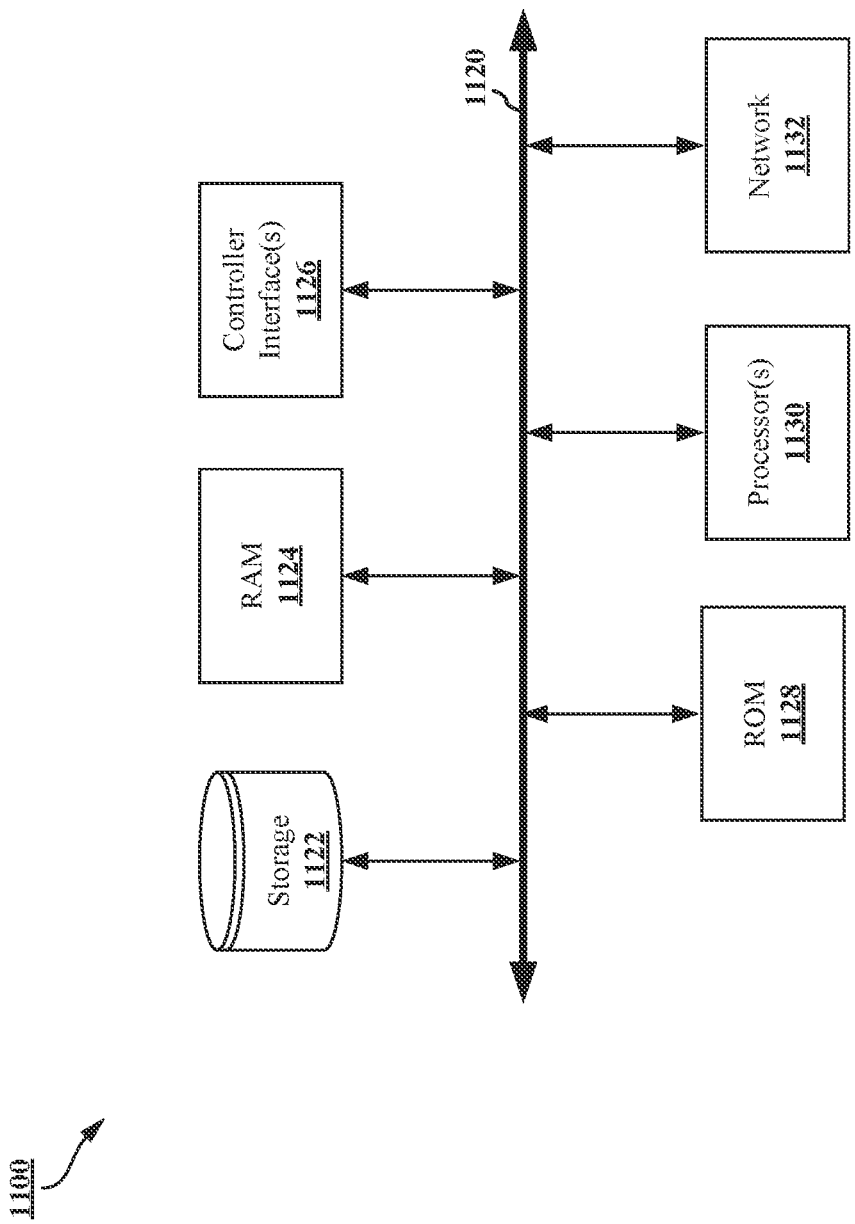
FIG. 11 is a block diagram of an example processing system configured to execute one or more sets of instructions to direct at least one robot for various operations associated with example engine vehicles, passenger vehicles, computing hubs, in accordance with various aspects of the present disclosure.

Turning now to FIG. 11, a block diagram illustrates an embodiment of a processing system 1100. The processing system 1100 may comprise at least one computing and/or processing system associated with at least an engine vehicle (e.g., engine vehicles 204, 304, 614, 822, 902, 1008, 1010), passenger vehicles (e.g., passenger vehicles 206, 306, 610, 612, 616a, 616b, 618, 1014), global computing hub of VRR system, local computing hub of VRR system described herein.

The system 1100 may include various types of machine-readable media and interfaces. As illustrated, the system 1100 includes at least one interconnect 1120 (e.g., at least one bus), a permanent storage device 1122, random-access memory (RAM) 1124, at least one controller interface(s) 1126, read-only memory (ROM) 1128, at least one processor(s) 1130, and a network component 1132.

The interconnect 1120 may communicatively connect components and/or devices that are collocated with the system 1100, such as internal components and/or internal devices within a housing of the system 1100. For example, the interconnect 1120 may communicatively connect the processor(s) 1130 with the permanent storage device 1122, RAM 1124, and/or ROM 1128. The processor(s) 1130 may be configured to access and load computer-executable instructions from at least one of the permanent storage device 1122, RAM 1124, and/or ROM 1128.

The permanent storage 1122 may be non-volatile memory that stores instructions and data, independent of the power state (e.g., on or off) of the system 1100. For example, the permanent storage 1122 may be a hard disk, flash drive, or another read/write memory device.

ROM 1128 may store static instructions enabling basic functionality of the system 1100, as well as the components therein. For example, ROM 1128 may store instructions for the processor(s) 1130 to execute a set of processes associated with operations described herein in FIGS. 1-10F, with respect to one or more of the engine vehicles, passenger vehicles, global computing hub of VRR system, local computing hub of VRR system. Examples of ROM 1128 may include erasable programmable ROM (EPROM) or electrically EPROM (EEPROM), compact disc ROM (CD-ROM) or other optical disk storage, magnetic disk storage or other magnetic storage devices, and/or another computer-accessible and computer-readable medium that may store program code as instructions and/or data structures.

RAM 1124 may include volatile read/write memory. RAM 1124 may store computer-executable instructions associated with runtime operation(s) by the processor(s) 1130. In addition, RAM 1124 may store real-time data captured of a vehicle, for example, as described with respect to one or more of FIGS. 1-10F, above.

The processor(s) 1130 may be implemented with one or more general-purpose and/or special-purpose processors. Examples of general-purpose and/or special-purpose processors may include microprocessors, microcontrollers, DSP processors, and/or any other suitable circuitry configured to execute instructions loaded from at least one of the permanent storage device 1122, RAM 1124, and/or ROM 1128. Alternatively or additionally, the processor(s) 1130 may be implemented as dedicated hardware, such as at least one field programmable gate array (FPGA), at least one programmable logic device (PLD), at least one controller, at least one state machine, a set of logic gates, at least one discrete hardware component, or any other suitable circuitry and/or combination thereof.

The interconnect 1120 may further communicatively connect the system 1100 with one or more controller interface(s) 1126. The controller interface(s) 1126 may communicatively connect the system 1100 with various circuitry associated with one or more vehicles (e.g., engine vehicles, passenger vehicles, and the like), computing hubs (e.g., global computing hub, local computing hub, and the like) described herein. Instructions executed by the processor(s) 1130 may cause instructions to be communicated with vehicles (e.g., engine vehicles, passenger vehicles, and the like), computing hubs (e.g., global computing hub, local computing hub, and the like) through the controller interface(s) 1126, which may cause various operations of engine vehicles, passenger vehicles, and the like described herein with respect to FIGS. 1-10F.

In some embodiments, the system 1100 may include a network component 1132. The network component 1132 may be configured to communicate over a network, for example, in order to transmit and/or receive instructions associated with the operations described herein with respect to FIGS. 1-10F. Instructions communicated over a network through the network component 1132 may include instructions associated with the operations described herein with respect to FIGS. 1-10F. Examples of a network through which the network component 1132 may communicate may include a local area network (LAN), a wide area network (WAN), the Internet, an intranet, or another wired or wireless network.

Various aspects described herein may be implemented at least partially as software processes of a computer-programming product. Such processes may be specified as a set of instructions recorded on a machine-readable storage medium. When a set of instructions is executed by the processor(s) 1130, the set of instructions may cause the processor(s) to perform operations indicated and recorded in the set of instructions.

The previous description is provided to enable any person skilled in the art to practice the various aspects described herein. Various modifications to these exemplary embodiments presented throughout this disclosure will be readily apparent to those skilled in the art. Thus, the claims are not intended to be limited to the exemplary embodiments presented throughout the disclosure, but are to be accorded the full scope consistent with the language claims. All structural and functional equivalents to the elements of the exemplary embodiments described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), or analogous law in applicable jurisdictions, unless the element is expressly recited using the phrase "means for" or, in the case of a method claim, the element is recited using the phrase "step for."

What is claimed is:

1. A system comprising:
one or more passenger vehicles of a peloton; and
a first engine vehicle of the peloton, communicatively connected to the one or more passenger vehicles, wherein the first engine vehicle comprises:
a processor communicatively connected to a memory and configured to:
receive status information of the one or more passenger vehicles;
determine, based on the received status information, a set of current values for a set of vehicle attributes for each of the one or more passenger vehicles; and
adjust, based on the set of current values for the set of vehicle attributes, a position of a corresponding passenger vehicle of the one or more passenger vehicles,
wherein at least one passenger vehicle of the one or more passenger vehicles comprises a deployable shroud that comprises a set of electrical wiring configured to electrically connect at least two passenger vehicles of the one or more passenger vehicles.

2. The system of claim 1, wherein the processor is further configured, as part of being configured to adjust the position of the corresponding passenger vehicle of the one or more passenger vehicles, to cause the corresponding passenger vehicle to increase or decrease speed of the corresponding passenger vehicle.

3. The system of claim 1, wherein the processor is further configured, as part of being configured to increase or decrease the speed of the corresponding passenger vehicle, to:
determine a distance between the corresponding passenger vehicle and another passenger vehicle of the one or more passenger vehicles of the peloton; and
increase the speed of the corresponding passenger vehicle when the distance satisfies a first gap threshold value, wherein the satisfaction of the first gap threshold value indicates that the distance between the corresponding passenger vehicle and the another passenger vehicle exceeds a desired gap between the corresponding passenger vehicle and the another passenger vehicle, and
decrease the speed of the corresponding passenger vehicle when the distance satisfies a second gap threshold value, wherein the satisfaction of the second gap threshold value indicates that the distance between the corresponding passenger vehicle and the another passenger vehicle is less than the desired gap between the corresponding passenger vehicle and the another passenger vehicle.

4. The system of claim 1, wherein the processor is further configured, as part of being configured to adjust the position of the corresponding passenger vehicle, to cause the corresponding passenger vehicle to uncouple from the peloton.

5. The system of claim 1, wherein the set of vehicle attributes comprises at least one of a fuel level, operational range, or operational health.

6. The system of claim 1, wherein the processor is further configured to:
cause the at least one passenger vehicle to extend the deployable shroud towards at least one other passenger vehicle of the one or more passenger vehicles.

7. A system, comprising:
one or more passenger vehicles of a peloton; and
a first engine vehicle of the peloton, communicatively connected to the one or more passenger vehicles, wherein the first engine vehicle comprises:
a processor communicatively connected to a memory and configured to:
receive status information of the one or more passenger vehicles;
determine, based on the received status information, a set of current values for a set of vehicle attributes for each of the one or more passenger vehicles; and
adjust, based on the set of current values for the set of vehicle attributes, a position of a corresponding passenger vehicle of the one or more passenger vehicles, wherein at least one passenger vehicle of the one or more passenger vehicles of the peloton comprises a set of electrical connectors to receive a deployable shroud from another passenger vehicle of the one or more passenger vehicles.

8. The system of claim 7, wherein the deployable shroud covers a top area of a gap between the least one passenger vehicle and the another passenger vehicle.

9. The system of claim 7, wherein the deployable shroud covers one or more sides of a gap between the least one passenger vehicle and the another passenger vehicle.

10. The system of claim 7, wherein the deployable shroud comprises at least one of a stiff panel, a flexible fabric, a rigid frame, or an extendible frame.

11. A system comprising:
one or more passenger vehicles of a peloton;
a first engine vehicle of the peloton, communicatively connected to the one or more passenger vehicles, wherein the first engine vehicle comprises:
a processor communicatively connected to a memory and configured to:
receive status information of the one or more passenger vehicles;
determine, based on the received status information, a set of current values for a set of vehicle attributes for each of the one or more passenger vehicles; and
adjust, based on the set of current values for the set of vehicle attributes, a position of a corresponding passenger vehicle of the one or more passenger vehicles; and
a first lane configured for transportation of the peloton, wherein the first lane comprises a wall along a length of the first lane,
wherein a surface of the wall comprises one or more aerodynamic features configured to increase aerodynamic efficiency of the peloton.

12. The system of claim 11, wherein the first lane is adjacent to one or more regular traffic lanes.

13. The system of claim 11, wherein one of the one or more aerodynamic features is at least one of a set of dimples on the surface of the wall, a set of air channels configured to allow air to pass through the wall, or a set of slats.

14. The system of claim 11, wherein the first lane is at a lower elevation than one or more regular traffic lanes.

15. A system, comprising: one or more passenger vehicles of a peloton;
a first engine vehicle of the peloton, communicatively connected to the one or more passenger vehicles, wherein the first engine vehicle comprises:
a processor communicatively connected to a memory and configured to:
receive status information of the one or more passenger vehicles;
determine, based on the received status information, a set of current values for a set of vehicle attributes for each of the one or more passenger vehicles;
and adjust, based on the set of current values for the set of vehicle attributes, a position of a corresponding passenger vehicle of the one or more passenger vehicles;
and a second lane configured to receive a set of passenger vehicles different from the one or more passenger vehicles of the peloton,
wherein at least one passenger vehicle of the one or more passenger vehicles comprises a deployable shroud that comprises a set of electrical wiring configured to electrically connect at least two passenger vehicles of the one or more passenger vehicles.

16. The system of claim 15, wherein the processor is further configured to:
determine, for each passenger vehicle in the set of passenger vehicles, a position in the peloton.

17. The system of claim 15, wherein the processor is further configured, as part of being configured to determine, for each passenger vehicle in the set of passenger vehicle, the position in the peloton, to:
determine, for each passenger vehicle in the set of passenger vehicles, at least one of a destination location of the passenger vehicle, a current fuel level of the passenger vehicle, or a range of the passenger vehicle; and
identify, based on the at least one of the destination location, the current fuel level, or the range, the position in the peloton for the passenger vehicle.

18. The system of claim 16, wherein the processor is further configured to:
for each passenger vehicle in the set of passenger vehicles:
transmit an instruction to a subset of passenger vehicles of the one or more passenger vehicles of the peloton to reduce corresponding speeds, wherein a current position of each passenger vehicle of the subset of passenger vehicles is equal to or greater than the corresponding determined position of the passenger vehicle in the set of passenger vehicles; and
cause the passenger vehicle in the set of passenger vehicles to merge into the peloton at the corresponding determined position in the peloton.

19. The system of claim 18, wherein the processor is further configured, as part of being configured to cause the passenger vehicle in the set of passenger vehicles to merge into the peloton at the corresponding determined position in the peloton, to transmit an instruction to each passenger vehicle in the set of passenger vehicles to join the peloton at the corresponding determining position in the peloton.

20. The system of claim 11, further comprising a second engine vehicle, wherein the processor is configured to:
transmit an instruction to the second engine vehicle to enter the first lane; and
cause the first engine vehicle to uncouple from the peloton; and
cause the first engine vehicle to exit the first lane.

* * * * *